(12) United States Patent
Sakai

(10) Patent No.: US 9,659,231 B2
(45) Date of Patent: May 23, 2017

(54) IMAGE ANALYSIS DEVICE, METHOD FOR CREATING IMAGE FEATURE INFORMATION DATABASE, AND DESIGN SIMILARITY DETERMINATION APPARATUS AND METHOD

(71) Applicant: HONDA MOTOR CO., LTD., Tokyo (JP)

(72) Inventor: Saburo Sakai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/878,337

(22) Filed: Oct. 8, 2015

(65) Prior Publication Data

US 2016/0155018 A1    Jun. 2, 2016

(30) Foreign Application Priority Data

Nov. 28, 2014  (JP) ................. 2014-242149

(51) Int. Cl.
*G06K 9/48* (2006.01)
*G06K 9/62* (2006.01)
*G06F 17/30* (2006.01)
*G06T 7/68* (2017.01)

(52) U.S. Cl.
CPC ....... *G06K 9/6202* (2013.01); *G06F 17/3025* (2013.01); *G06K 9/481* (2013.01); *G06T 7/68* (2017.01); *G06K 2009/6213* (2013.01)

(58) Field of Classification Search
CPC .... G06K 9/6202; G06K 9/481; G06K 9/6215; G06T 7/0083; G06T 7/608

USPC ......................................................... 382/197
See application file for complete search history.

(56) References Cited

U.S. PATENT DOCUMENTS

| 2002/0057838 | A1* | 5/2002 | Steger | G06K 9/6203 |
| | | | | 382/197 |
| 2007/0297681 | A1* | 12/2007 | Wenzel | G06K 9/4609 |
| | | | | 382/209 |
| 2014/0355849 | A1* | 12/2014 | Brossette | G06F 19/3462 |
| | | | | 382/128 |

FOREIGN PATENT DOCUMENTS

JP    2000-020721 A    1/2000

* cited by examiner

*Primary Examiner* — Ruiping Li
(74) *Attorney, Agent, or Firm* — Squire Patton Boggs (US) LLP

(57) ABSTRACT

Provided is an image analysis device for specifying an image region of an object being the basis for design similarity determination. An image analysis device 100 includes units 112, 113. The unit 112 moves original images Im1 and Im2 including a designated image region H with a rotationally symmetry on a first point P relative to a reference image Im2($j$), calculates a correlation value cim(j) at each relative position, and detects the position of the point P in the images Im1, Im2, according to a geometric model, based on the amount of rotation θ(j) at which the cim(j) is the maximum and a vector v(j). The unit 113 specifies the range of the region H in the images Im1, Im2 based on the position of the point P and the distribution of the brightness values of pixels in the images Im1, Im2.

11 Claims, 25 Drawing Sheets

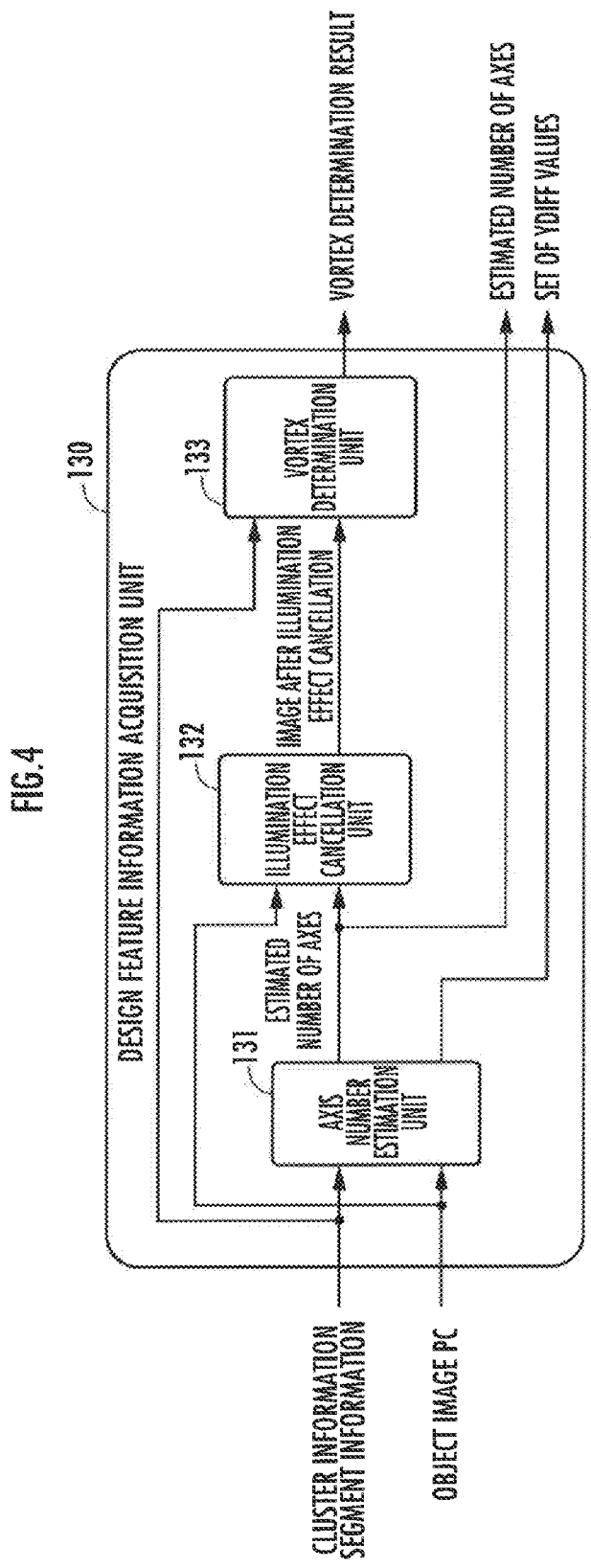

FIG.5B (EACH REGISTERED IMAGE RIm(i))
- ORIGINAL IMAGE
- META INFORMATION
- REGISTRATION NUMBER
- REGISTERED NATION
- CENTRAL COORDINATE INFORMATION
- REGION INFORMATION (EFFECTIVE RADIUS)
- CLUSTER SIZE
- AVERAGE VALUE OF AREAS OF SEGMENTS
- SET OF YDIFF VALUES
- RANGE OF X-COORDINATE VALUE
- ESTIMATED NUMBER OF AXES
- VORTEX DETERMINATION RESULT

FIG.5A (QUERY IMAGE TIm)
- CENTRAL COORDINATE INFORMATION
- REGION INFORMATION (EFFECTIVE RADIUS)
- CLUSTER SIZE
- AVERAGE VALUE OF AREAS OF SEGMENTS
- SET OF YDIFF VALUES
- RANGE OF X-COORDINATE VALUE
- ESTIMATED NUMBER OF AXES
- VORTEX DETERMINATION RESULT

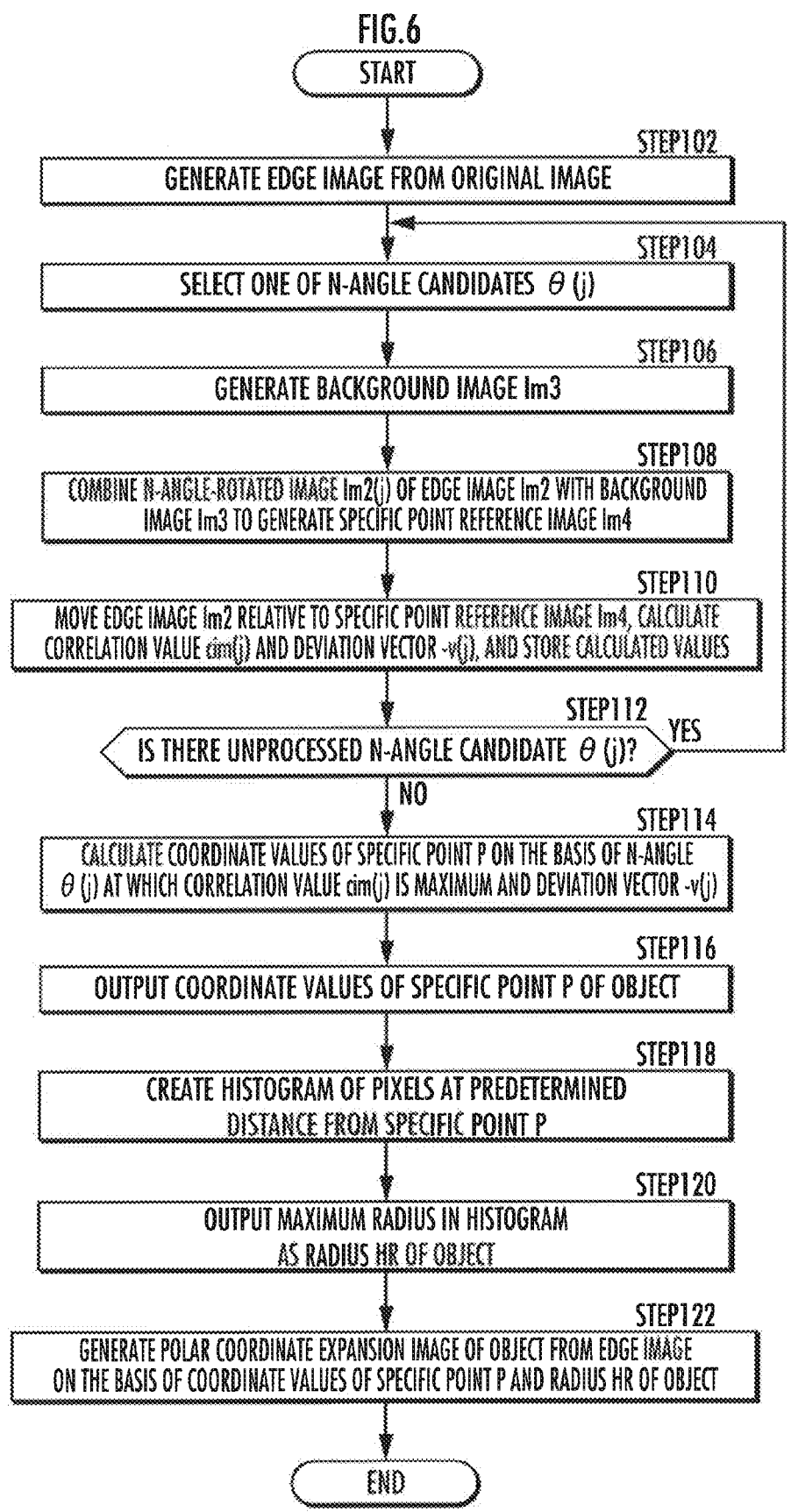

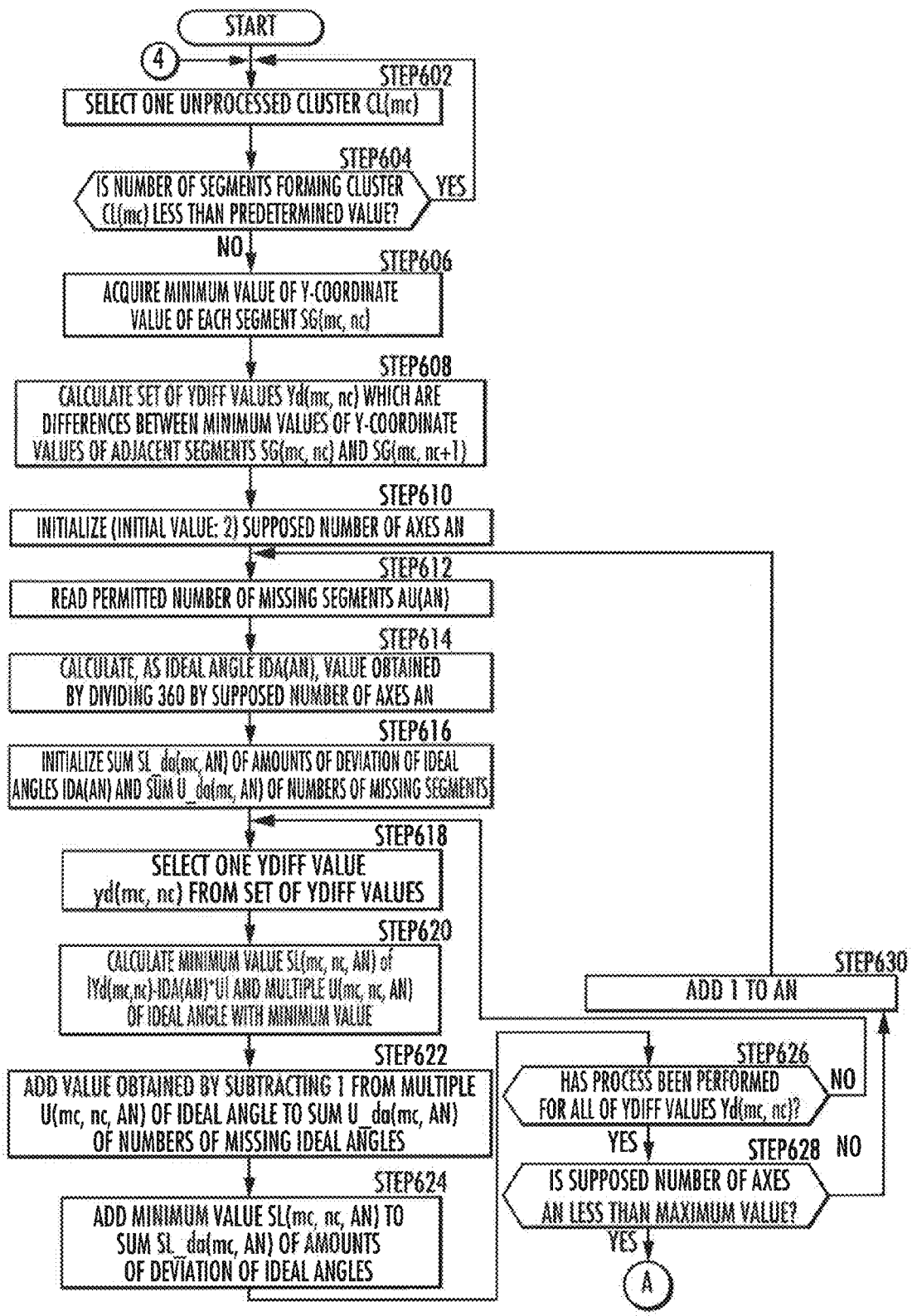

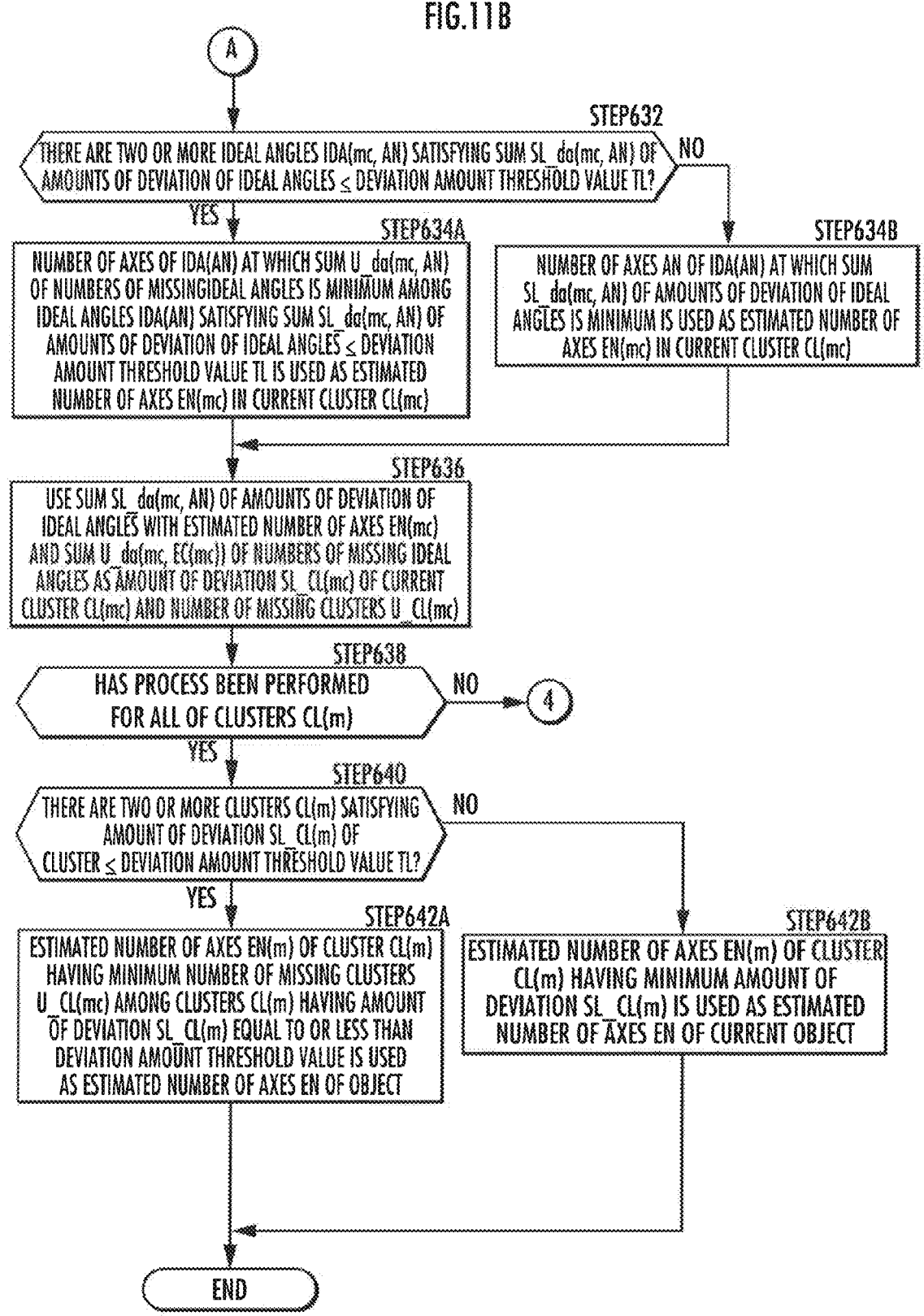

FIG. 20A
FIG. 20B
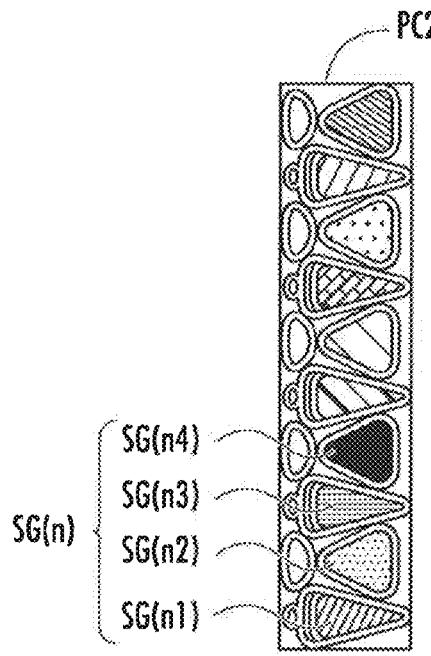
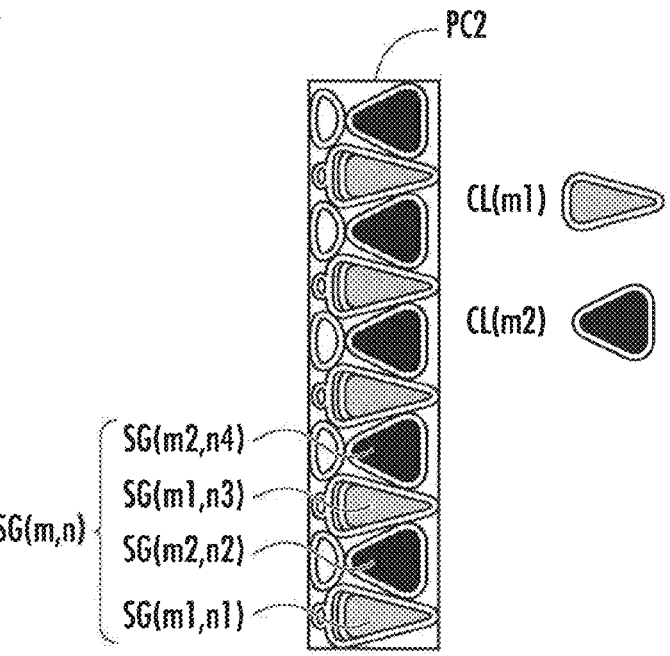
FIG. 20C
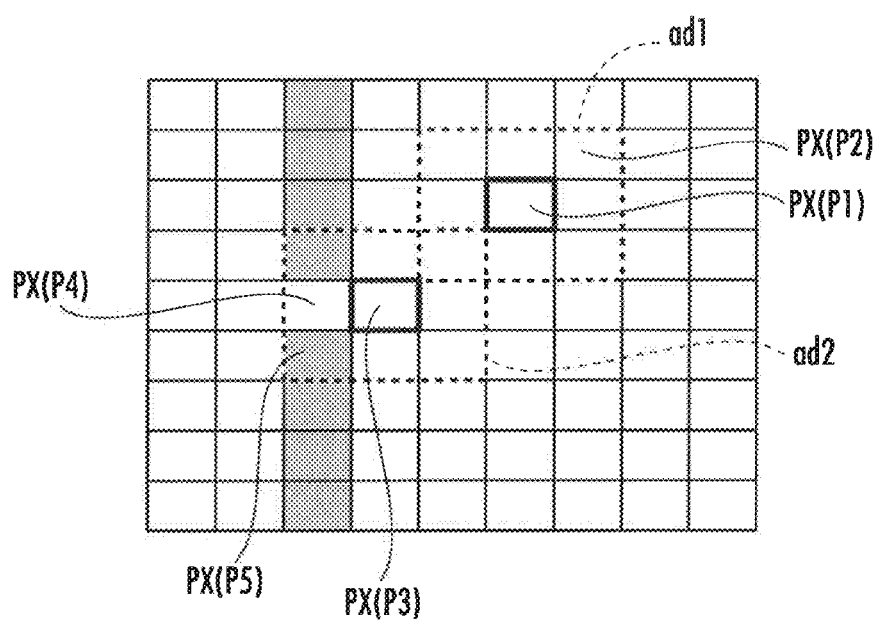

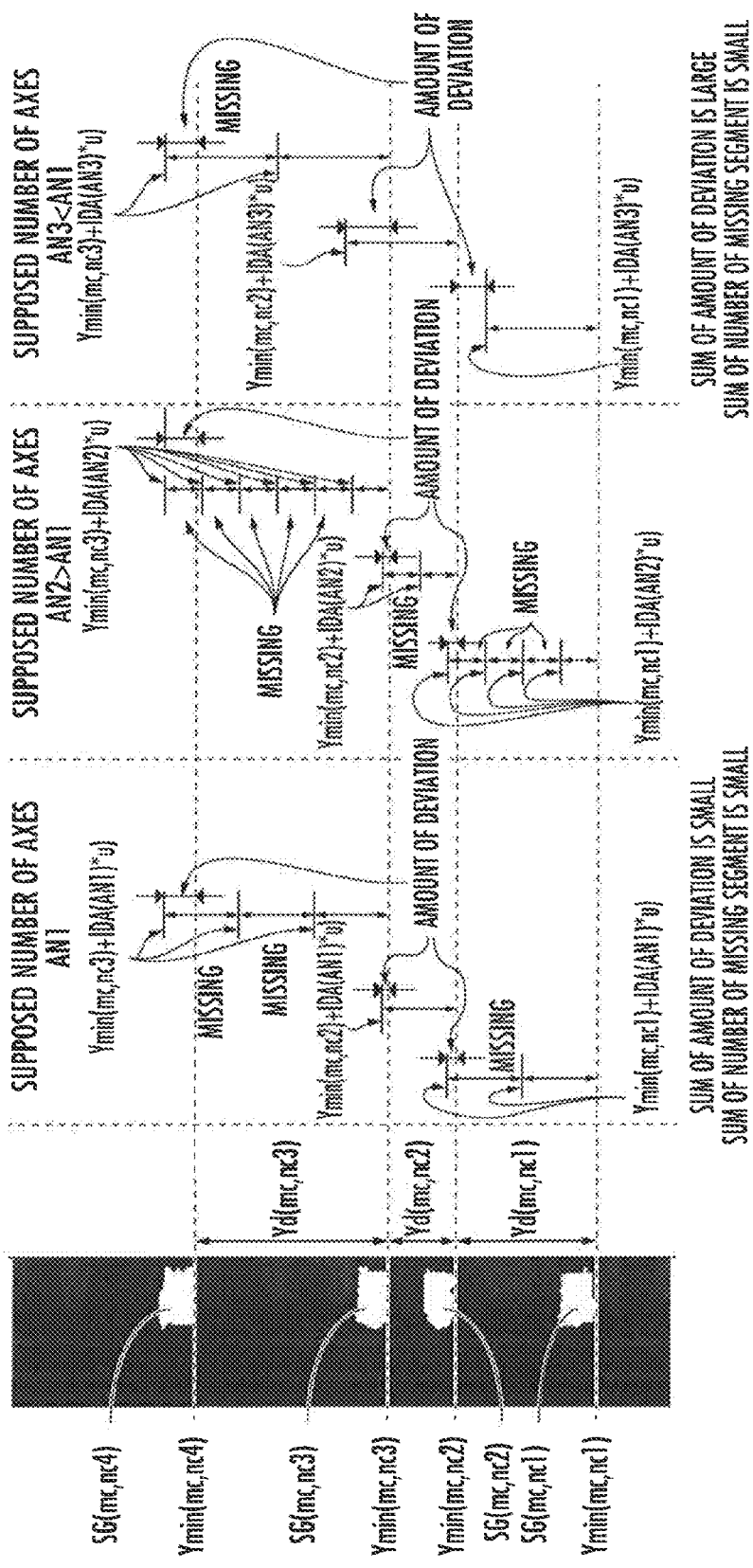

IMAGE ANALYSIS DEVICE, METHOD FOR CREATING IMAGE FEATURE INFORMATION DATABASE, AND DESIGN SIMILARITY DETERMINATION APPARATUS AND METHOD

TECHNICAL FIELD

The present invention relates to an image analysis device, an image feature information database creation method, and a design similarity determination apparatus and method.

BACKGROUND

In the development phase of a product having rotational symmetry, such as a wheel, it is investigated whether there is a registered design similar to the design of the product. However, there is a concern that it will take a lot of time to investigate a huge number of registered designs including foreign registered designs. Therefore, an apparatus which can accurately determine the similarity of the design included in an image, such as a registered trademark, is required in order to accurately search for the registered designs similar to the design of the product under development.

As an apparatus which determines the similarity between images to search for a similar image, the following apparatus is disclosed in JP 2000-20721 A (Patent Document 1): a method which determines the similarity between two images, on the basis of an autocorrelation coefficient of the brightness value of each pixel in grayscale texture images of the two images, periodicity feature information related to the periodicity of the distribution of the brightness values of the pixels in each region of the image, and statistical feature information related to the statistical distribution of the brightness values of the pixels in each region of the image.

However, the technique disclosed in Patent Document 1 determines only the similarity between the images. Therefore, even when the technique is used to determine the similarity between the designs, the accuracy of determination is likely to be reduced in the following case: the image includes an image region different from an image region in which a target object (hereinafter, appropriately referred to as an "object") which will be the basis for design similarity determination is present; and the result of the process of determining the similarity between the images is reflected in the result of the process of determining the similarity between the designs, without any change.

SUMMARY

Accordingly, an object of the invention is to provide an image analysis device that can accurately specify an image region of a target object (object) which is rotational symmetric and will be the basis for design similarity determination, a method for creating an image feature information database that stores feature information of the image region of the object, and a design similarity determination apparatus and method that accurately determines the similarity between designs using the image analysis device.

An image analysis device according to the invention includes: a first point detection unit that moves an original image including a designated image region which is rotationally symmetric with respect to a first point relative to a reference image which is obtained by rotating the original image about a second point on the original image, calculates a correlation value between the original image and the reference image at each relative position, and detects the position of the first point in the original image, according to a geometric model indicating a relative positional relationship between the first point and the second point in the original image, on the basis of the amount of rotation of the reference image about the second point at a relative position between the original image and the reference image where the correlation value is the maximum and a vector indicating a deviation between the second point of the original image and the second point of the reference image; and a region specifying unit that specifies a range of the designated image region in the original image, on the basis of the detected position of the first point and a distribution of brightness values of pixels in the original image.

The designated image region is rotationally symmetric with respect to the first point (unknown). Therefore, when the correlation value between the "original image" and the "reference image" obtained by rotating the original image about the second point on the original image is the maximum, the probability that the positions of the first points in the original image and the reference image will be aligned with each other and the amount of rotation will be equal to the amount of rotation corresponding to the rotational symmetry of the polar coordinate expansion image is high. Therefore, the position of the first point relative to the second point in the original image is accurately specified on the basis of the amount of rotation and the vector indicating the position of the second point in the reference image relative to the position of the second point in the original image, in the state in which the correlation value is the maximum.

In addition, since the designated image region is rotationally symmetric, the range of the designated image region in the original image is accurately specified on the basis of the first point which is the center of rotation and the distribution of the brightness values of the pixels in the original image.

As such, the probability that the designated image region whose range has been specified in the original image will be an image region corresponding to an object having the design which is rotationally symmetric is high. Therefore, the image region of the object (target object) which will be the basis for design similarity determination is accurately specified.

The image analysis device according to the invention may further includes: an image generation unit that generates a polar coordinate expansion image of the designated image region, which has the position of the first point as the origin, has an axis corresponding to a radius direction of the designated image region as a first axis, and has an axis that corresponds to a circumferential direction of the designated image region and is perpendicular to the first axis as a second axis, on the basis of the first point and the range of the designated image region; and a feature information acquisition unit that analyzes the polar coordinate expansion image and acquires feature information included in the polar coordinate expansion image.

According to the image analysis device having the above-mentioned structure, the polar coordinate expansion image having a regularity corresponding to the rotational symmetry of the designated image region is generated in the circumferential direction (the second axis of the polar coordinate expansion image) about the first point. Then, the polar coordinate expansion image is analyzed and the feature information included in the polar coordinate expansion image which results from periodicity is acquired.

In the image analysis device having the above-mentioned structure, the image generation unit may be configured such that it generates an edge image of the original image and generates a polar coordinate expansion image of the edge image, which has a first point of the edge image as the origin, to generate the polar coordinate expansion image of the designated image region. The feature information acquisition unit may include: a segment division unit that separates the polar coordinate expansion images into a plurality of segments which are partitioned by an edge line; and a line symmetry determination unit that compares the shape of each segment included in the polar coordinate expansion image with the shape of each segment included in an image obtained by inverting the polar coordinate expansion image in the direction of the second axis and determines whether each segment is symmetric with respect to a straight line parallel to the first axis.

According to the image analysis device having the above-mentioned structure based on the regularity of the second axis direction and the line symmetry of the first axis direction, information indicating whether each segment included in the polar coordinate expansion image is symmetric with respect to a line is accurately acquired by a simple method which compares the polar coordinate expansion image with the image which has the first point as the center and is inverted in the second axis direction.

As described above, the probability of the designated image region being an image region corresponding to the object is high. Therefore, as the feature information of the object, information indicating whether the object has a component that is symmetric with respect to a line is accurately acquired.

In the image analysis device, the image generation unit may be configured such that it generates an edge image of the original image and generates a polar coordinate expansion image of the edge image, which has a first point of the edge image as the origin, to generate the polar coordinate expansion image of the designated image region. The feature information acquisition unit may include: a segment division unit that separates the polar coordinate expansion images into a plurality of segments which are partitioned by an edge line; a clustering unit that groups a plurality of segments having a similar shape into one cluster; and a distance acquisition unit that acquires a distance between the segments, which belong to each cluster and are adjacent to each other in the direction of the second axis, in the polar coordinate expansion image in the direction of the second axis.

According to the image analysis device having the above-mentioned structure, after the edge image is generated, clustering is performed on the basis of shape. Therefore, the distance in the second axis direction of the segment is accurately acquired and information indicating regular features in the second axis direction of the polar coordinate expansion image is accurately acquired.

In the image analysis device having the above-mentioned structure, the feature information acquisition unit may include a rotational symmetry estimation unit. On condition that the designated image region has a predetermined number of rotational symmetries which is equal to or greater than 2, the rotational symmetry estimation unit may calculate an amount of deviation which is a difference between a theoretical distance between segments that are adjacent to each other in the direction of the second axis in each cluster in the second axis direction, and the actual distance between the adjacent segments in the second axis direction, which is acquired by the distance acquisition unit. When the sum of the amounts of deviation in the one cluster is equal to or less than a predetermined threshold value, the rotational symmetry estimation unit may estimate that the designated image region has the predetermined number of rotational symmetries.

According to the image analysis device having the above-mentioned structure, the rotational symmetry of the designated image region is accurately estimated on the basis of the difference between the theoretical distance between adjacent segments and the actual distance between adjacent segments which is closely related to rotational symmetry.

As described above, the probability of the designated image region being an image region corresponding to the object is high. Therefore, as the feature information of the object, the rotational symmetry of the object is accurately estimated.

In the image analysis device having the above-mentioned structure, the rotational symmetry estimation unit may calculate the amount of deviation between the adjacent segments belonging to each cluster for the predetermined number of rotational symmetries at each test distance obtained by multiplying a unit distance which is determined from the predetermined number of rotational symmetries by an integer equal to or greater than 1. The rotational symmetry estimation unit may calculate, as the number of missing segments, a value obtained by subtracting 1 from the multiplied integer for the test distance having the minimum amount of deviation among the amounts of deviation. When the sum of the minimum amounts of deviation in one cluster is equal to or less than the threshold value and the sum of the numbers of missing segments in one cluster is the minimum, the rotational symmetry estimation unit may estimate that the designated image region has the predetermined number of rotational symmetries.

According to the image analysis device having the above-mentioned structure, a plurality of test distances considering the number of missing segments is used. Therefore, after the missing segments are supplemented, the amount of deviation and the number of missing segments are calculated. Then, the rotational symmetry of the designated image region is estimated on the basis of the amount of deviation and the number of missing segments, appropriately considering the missing segments.

As described above, the probability of the designated image region being an image region corresponding to the object is high. Therefore, as the feature information of the object, the rotational symmetry of the object is accurately estimated.

A design similarity determination apparatus according to the invention scores a similarity between a first designated image region included in a first image and a second designated image region included in a second image and determines a similarity between designs included in the two images. The design similarity determination apparatus: the image analysis device according to the invention; and a scoring unit that performs scoring on the basis of feature information of the first designated image region included in the first image, which is acquired by the analysis of the first image by the image analysis device, and feature information of the second designated image region included in the second image, which is acquired by the analysis of the second image by the image analysis device.

According to the design similarity determination apparatus having the above-mentioned structure, scoring is performed on the basis of the feature information of the designated image region which is accurately acquired by the image analysis device according to the invention. Therefore, the similarity between the designs of the two images is accurately determined.

The design similarity determination apparatus having the above-mentioned structure may further include: a query image designation unit that receives a designated query image; and a storage unit that stores feature information of a plurality of comparative images. The scoring unit may perform the scoring, using the designated query image as the first image and each of the plurality of comparative images as the second image, to calculate the score of each of the comparative images and sorts the scores of the comparative images to make a ranking list of images including a design similar to the query image.

According to the design similarity determination apparatus having the above-mentioned structure, information about the comparative images similar to the designated query image is ranked according to the score. As a result, it is easy to investigate a similar design.

A method for creating an image feature information database according to the invention is performed by a computer including a storage unit for storing information and includes: a correlation value calculation step of moving an original image including a designated image region which is rotationally symmetric with respect to a first point relative to a reference image which is obtained by rotating the original image about a second point on the original image and calculating a correlation value between the original image and the reference image at each relative position; a first point detection step of detecting the position of the first point in the original image, according to a geometric model indicating a relative positional relationship between the first point and the second point in the original image, on the basis of the amount of rotation of the reference image about the second point at a relative position between the original image and the reference image where the correlation value is the maximum and a vector indicating a deviation between the second point of the original image and the second point of the reference image; a region specifying step of specifying a range of the designated image region in the original image, on the basis of the detected position of the first point and a distribution of brightness values of pixels in the original image; an image generation step of generating a polar coordinate expansion image of the designated image region, which has the position of the first point as the origin, on the basis of the first point and the range of the designated image region; a feature information acquisition step of analyzing the polar coordinate expansion image and acquiring feature information included in the polar coordinate expansion image; and a step of storing the feature information obtained in the feature information acquisition step in the storage unit so as to be associated with the original image and creating an image feature information database.

A design similarity determination method according to the invention is performed by a computer, scores a similarity between a first designated image region included in a first image and a second designated image region included in a second image, and determines a similarity between designs included in the two images. The design similarity determination method includes: a correlation value calculation step of moving an original image including a designated image region which is rotationally symmetric with respect to a first point relative to a reference image which is obtained by rotating the original image about a second point on the original image and calculating a correlation value between the original image and the reference image at each relative position; a first point detection step of detecting the position of the first point in the original image, according to a geometric model indicating a relative positional relationship between the first point and the second point in the original image, on the basis of the amount of rotation of the reference image about the second point at a relative position between the original image and the reference image where the correlation value is the maximum and a vector indicating a deviation between the second point of the original image and the second point of the reference image; a region specifying step of specifying a range of the designated image region in the original image, on the basis of the detected position of the first point and a distribution of brightness values of pixels in the original image; a polar coordinate expansion image generation step of generating a polar coordinate expansion image of the designated image region, which has the position of the first point as the origin, on the basis of the first point and the range of the designated image region; a feature information acquisition step of analyzing the polar coordinate expansion image and acquiring feature information included in the polar coordinate expansion image; and a scoring step of performing storing on the basis of feature information of the first designated image region included in the first image and feature information of the second designated image region included in the second image which are acquired in the feature information acquisition step. The scoring step is performed after the correlation value calculation step, the first point detection step, the region specifying step, the polar coordinate expansion image generation step, and the feature information acquisition step are performed for the first image and the second image.

In the design similarity determination method according to the invention, the computer may include a query image designation unit that receives a designated query image and a storage unit that stores feature information of a plurality of comparative images. The method may further include: a comparative image scoring step of performing the scoring in the scoring step, using the query image as the first image and each of the plurality of comparative images as the second image, to calculate the score of each of the comparative images; and a ranking list making step of sorting the scores of the comparative images to make a ranking list of images including a design similar to the query image.

BRIEF DESCRIPTION OF DRAWINGS

FIG. 4 is a block diagram illustrating a design feature information acquisition unit;

FIG. 5A is a diagram illustrating information about a query image which is stored in a storage unit;

FIG. 5B is a diagram illustrating information about a registered image which is stored in the storage unit;

FIG. 6 is a flowchart illustrating a specific point detection process;

FIG. 11A is a flowchart illustrating a process before an axis number estimation process;

FIG. 11B is a flowchart illustrating a process behind the axis number estimation process;

FIG. 20A is a diagram illustrating segments when clusters are not classified;

FIG. 20B is a diagram illustrating segments when clusters are classified;

FIG. 20C is a diagram illustrating a segment division process in the vicinity of a boundary line;

FIG. 21A to FIG. 21D are diagrams illustrating the axis number estimation process;

DETAILED DESCRIPTION

Hereinafter, an embodiment of the invention will be described using a similar design search server 1 as an example.

(Structure of Similar Design Search Server)

Figure 1:
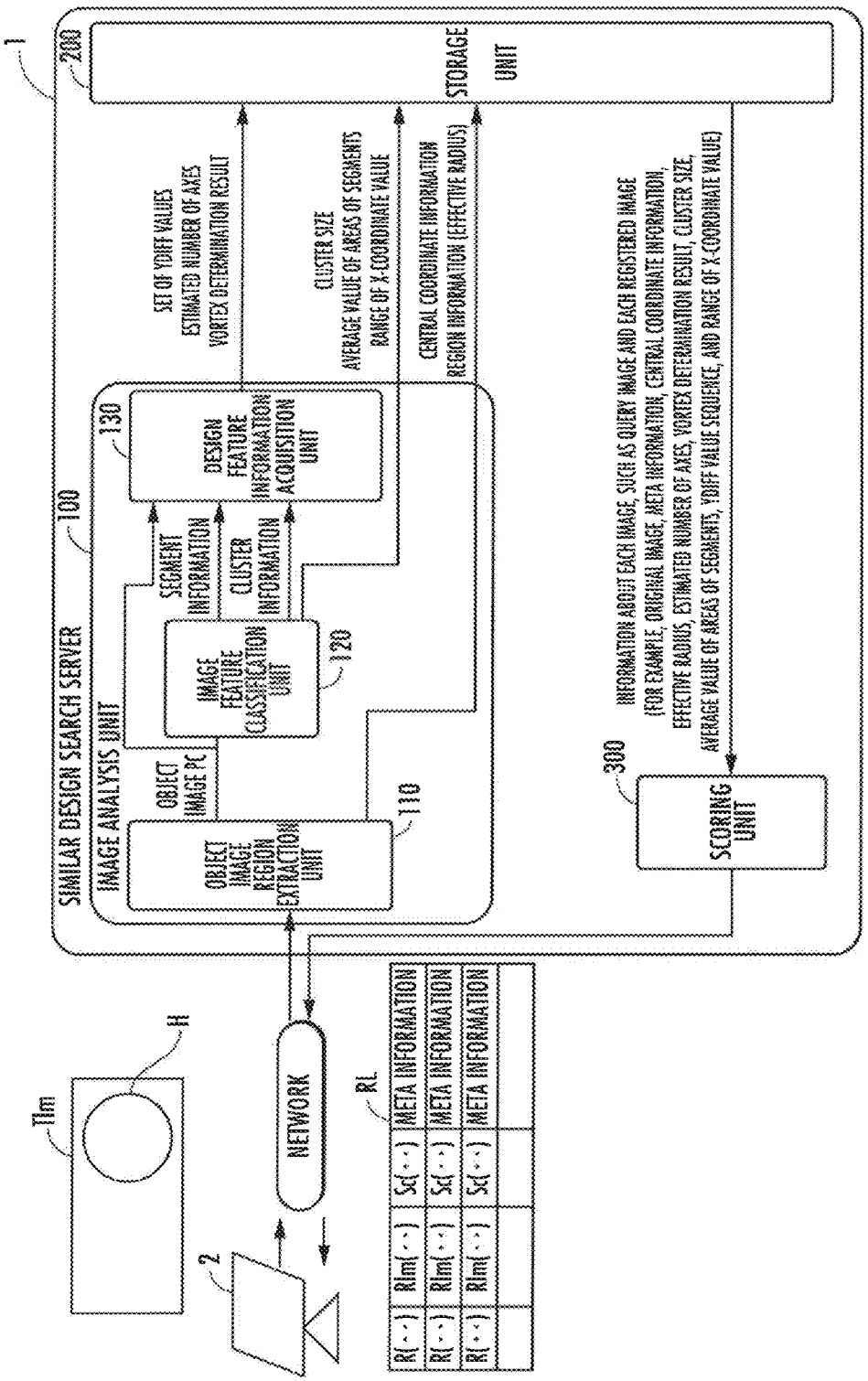
FIG. 1 is a diagram illustrating the overall structure of a similar design search server.

As illustrated in FIG. 1, the similar design search server 1 receives a query image TIm from a user terminal 2 through a network, such as the Internet, and transmits a ranking list RL to the user terminal 2 through the network.

In the ranking list RL, registered designs R(i) which are similar to the design of an object (for example, a vehicle wheel; hereinafter, referred to as an "object"), which will be the basis for similarity determination for the design included in an image region H of the query image TIm, are ranked in the order of similarity scores Sc(i).

Figure 15A:
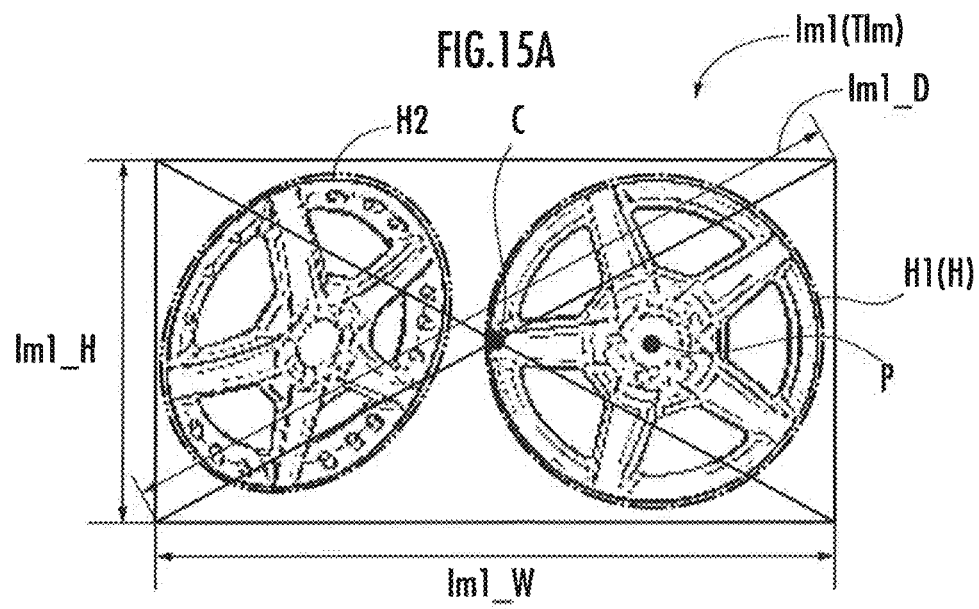
FIG. 15A is a diagram illustrating a query image (original image) and illustrates the original image.

In this embodiment, as illustrated in FIG. 15A, the query image TIm includes, as the image region H of the object, an image region H1 (a region surrounded by a one-dot chain line) of a wheel of the vehicle in a front view. In addition, the query image TIm includes an image region H2 (a region surrounded by a two-dot chain line) of the wheel of the vehicle, which is an image region different from the image region H of the object, in a perspective view.

Any object may be used as long as it is rotationally symmetric with respect to a specific point P (which corresponds to a "first point" in the invention) of the image region H. For example, the object may be a steering wheel of the vehicle.

The rotational symmetry is not necessarily rotational symmetry in a strict sense and may be sufficiently rotational symmetry to determine the similarity between the designs.

For example, when a picture is used as the original image, in some cases, the image region H of the object is not rotationally symmetric in a strict sense due to the emission of light or the influence of a shadow. In this case, in this embodiment, the term "the image region H of the object is rotationally symmetric with respect to the specific point P" means that the image region H of the object is rotationally symmetric enough to determine the similarity between the designs (a rough feature portion, such as the shape of the object included in the image region H after rotation, is identical to a rough feature portion, such as the shape of the object included in the image region H before rotation).

The similar design search server 1 is a server apparatus including an arithmetic device and a storage device. A portion of the similar design search server 1 may be formed by physically independent hardware. The similar design search server 1 may be integrated with the user terminal 2. In addition, the similar design search server 1 may be a portable terminal.

The user terminal 2 includes, for example, a computer (including an arithmetic processing device, such as a CPU, and a storage device, such as a main storage device, a sub-storage device, or an auxiliary storage device) and a display screen on which information is displayed. The user terminal 2 may be a portable terminal.

As illustrated in FIG. 1, the similar design search server 1 includes an image analysis unit 100 that analyzes the query image (original image) TIm received from the user terminal 2 and outputs various kinds of information, a storage unit 200 that stores the information output from the image analysis unit 100, and a scoring unit 300 that makes the ranking list RL on the basis of the information stored in the storage unit 200.

The arithmetic device reads a predetermined program stored in the storage device and executes the program to implement the function of the image analysis unit 100. Instead of this structure, the image analysis unit 100 may be formed by an image analysis server that is provided by a plurality of cases or a cloud service.

As illustrated in FIG. 1, the image analysis unit 100 includes an object image region extraction unit 110, an image feature classification unit 120, and a design feature information acquisition unit 130.

Figure 2:
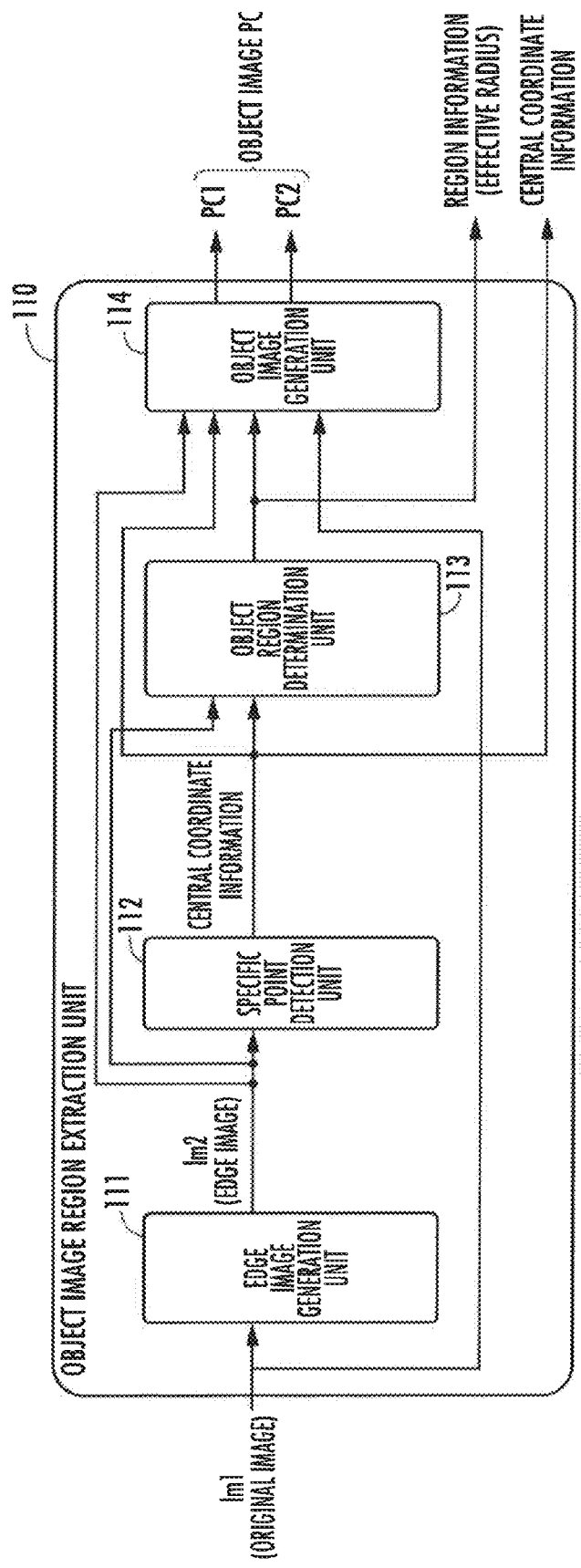
FIG. 2 is a block diagram illustrating an object image region extraction unit.

As illustrated in FIG. 2, the object image region extraction unit 110 includes an edge image generation unit 111, a specific point detection unit 112, an object region determination unit 113, and an object image generation unit 114.

The edge image generation unit 111, the specific point detection unit 112, the object region determination unit 113, and the object image generation unit 114 are configured so as to perform an object image region extraction process (see FIG. 6), which will be described below, in cooperation with each other.

The specific point detection unit 112 forms a "first point detection unit" according to the invention.

The object region determination unit 113 forms a "region specifying unit".

The edge image generation unit 111 and the object image generation unit 114 form an "image generation unit" according to the invention.

Figure 3:
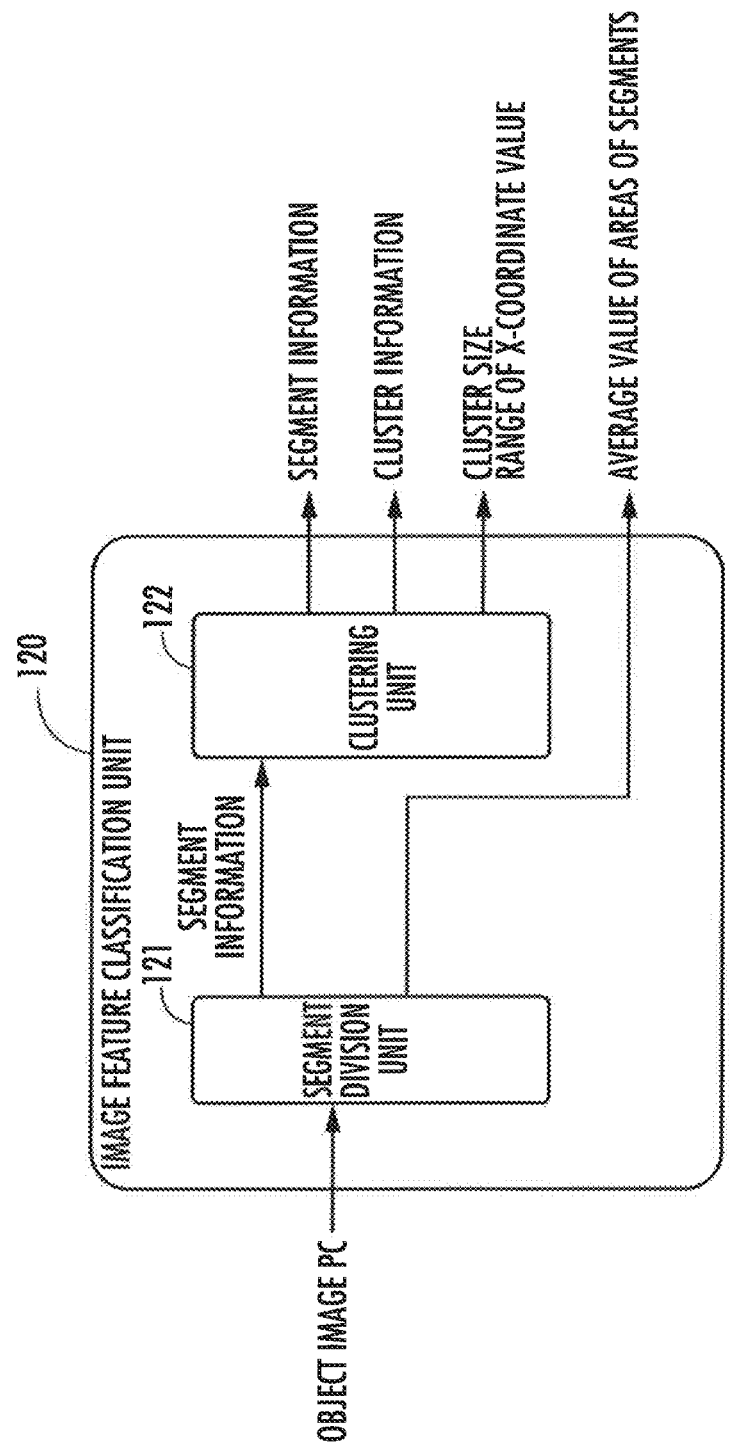
FIG. 3 is a block diagram illustrating an image feature classification unit.

As illustrated in FIG. 3, the image feature classification unit 120 includes a segment division unit 121 and a clustering unit 122.

The segment division unit 121 and the clustering unit 122 are configured so as to perform an image feature classification process (see FIGS. 7 to 9), which will be described below, in cooperation with each other.

As illustrated in FIG. 4, the design feature information acquisition unit 130 includes an axis number estimation unit 131, an illumination effect cancellation unit 132, and a vortex determination unit 133.

The axis number estimation unit 131, the illumination effect cancellation unit 132, and the vortex determination unit 133 are configured so as to perform a design feature information acquisition process (see FIGS. 10 to 13), which will be described below, in cooperation with each other.

The image feature classification unit 120 and the design feature information acquisition unit 130 form a "feature information acquisition unit" according to the invention.

The storage unit 200 includes storage devices, such as a main storage device, a sub-storage device, and an auxiliary storage device. Instead of this structure, the storage unit 200 may be formed by a database server that is provided by a plurality of cases or a cloud service.

As illustrated in FIG. 5A, the storage unit 200 temporarily stores various kinds of information (central coordinate information, region information (effective radius), a cluster size, the average value of the areas of segments, the range of an X-coordinate value, a set of YDIFF values, the estimated number of axes, and a vortex determination result) about the query image TIm output from the image analysis unit 100.

As illustrated in FIG. 5B, the storage unit 200 further stores various kinds of information (the original images RIm(i) including the image regions of the registered designs R(i), meta information including, for example, the source of an image, a registration number, a registered nation, central coordinate information, region information (effective radius), a cluster size, the average value of the areas of segments, the range of an X-coordinate value, a set of YDIFF values, the estimate number of axes, and a vortex determination result) which have been analyzed by the image analysis unit 100, using the images RIm(i) including the image region of each of a plurality of registered designs R(i) as the original image.

The arithmetic device reads a predetermined program stored in the storage device and executes the program to implement the function of the scoring unit 300. Instead of this structure, the scoring unit 300 may be formed by a scoring server that is provided by a plurality of housings or a cloud service.

The scoring unit 300 is configured to perform a scoring process (see FIG. 14) which will be described below.

(Functions of Image Analysis Unit)

Next, processes which are performed by each component of the image analysis unit 100 will be described in detail with reference to the flowcharts illustrated in FIGS. 6 to 14.

The execution of corresponding information processing by a component according to the invention means that the component is programmed to read a program from a storage device, such as a memory, and to perform the corresponding information processing according to the program.

(Object Image Extraction Process)

Next, the process of the object image region extraction unit 110 will be described with reference to FIG. 6.

Figure 15B:
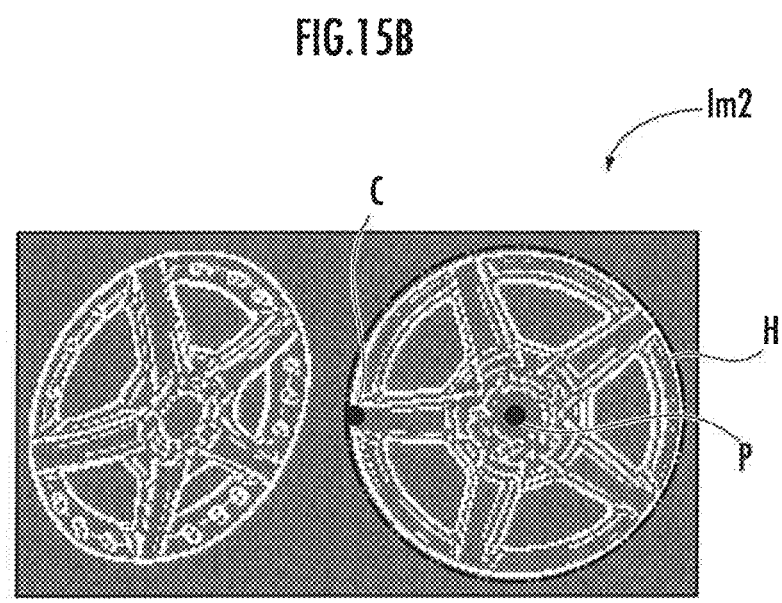
FIG. 15B is a diagram illustrating a query image (original image) and illustrates an edge image.

The edge image generation unit 111 performs a process of extracting an edge from an original image Im1 illustrated in FIG. 15A and generates an edge image Im2 illustrated in FIG. 15B (FIG. 6/STEP102). The size of the edge image Im2 is equal to that of the original image Im1.

Elements (for example, the image region H of the object, the specific point P, and an image center point C (the center point of rotation of an image)) which are common to the original image Im1 and the edge image Im2 are denoted by the same reference numerals.

Each of the original image Im1 and the edge image Im2 corresponds to an "original image" according to the invention.

The specific point detection unit 112 selects one of unprocessed N-angle candidates θ(j) (FIG. 6/STEP104). The N-angle candidates θ(j) are candidate angles for rotating the edge image Im2. For example, 180 degrees, 120 degrees, 90 degrees, 72 degree, 60 degrees, . . . are used as the N-angle candidates θ(j). In addition, instead of degree, radian may be used as the unit of angular measure.

Figure 16A:
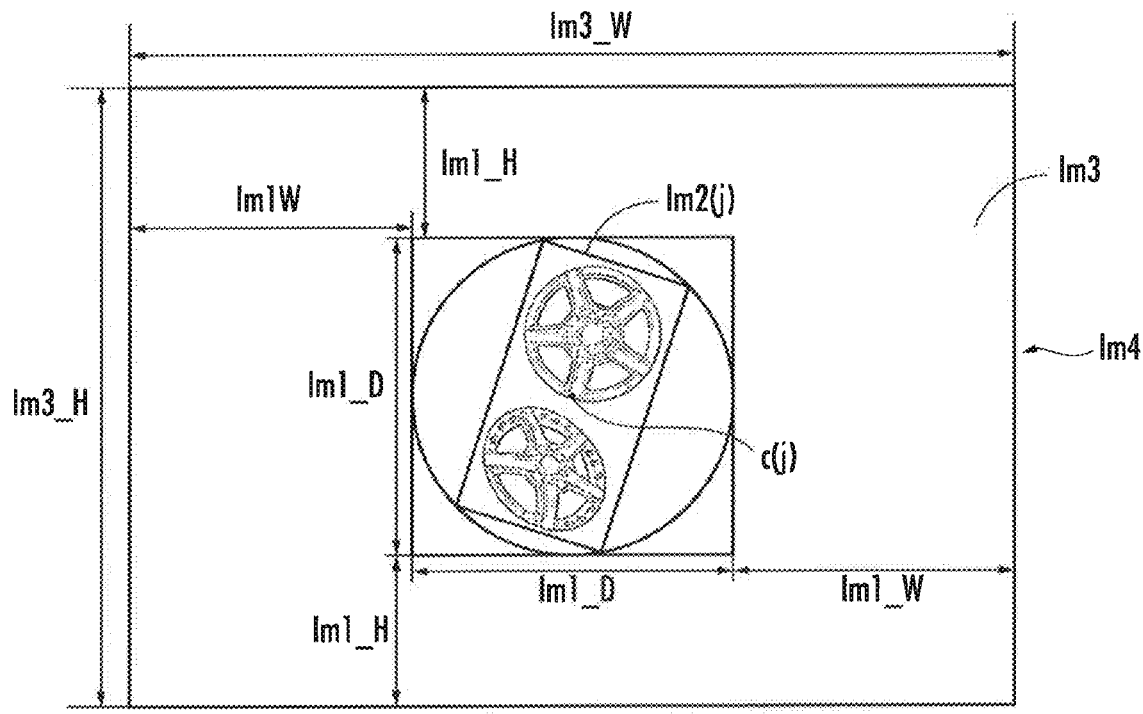
FIG. 16A is a diagram relates to a specific point detection process and illustrates a comparative image.

As illustrated in FIG. 16A, the specific point detection unit 112 generates a black (the same color as that of the background of the edge image Im2) background image Im3 (FIG. 6/STEP106). In the drawings used in the following description, for convenience of explanation, white and black are appropriately inverted and used.

Here, as illustrated in FIG. 16A, the width Im3_W of the background image Im3 is equal to the sum of two times the width Im1_W (see FIG. 15B) of the original image Im1 and the length Im1_D (see FIG. 15B) of the diagonal line of the original image Im1.

As illustrated in FIG. 16A, the height Im3_H of the background image Im3 is equal to the sum of two times the height Im1_H (see FIG. 15B) of the original image Im1 and the length Im1_D (see FIG. 15B) of the diagonal line of the original image Im1.

As illustrated in FIG. 16A, the specific point detection unit 112 combines a rotated image Im2(j), which is obtained by rotating the edge image Im2 about the image center point C of the edge image Im2 by the N-angle candidate θ(j), with a circle which is arranged at the center of the background image Im3 and has a diameter Im2_D to generate a specific point detection reference image Im4 (FIG. 6/STEP108).

Figure 16B:
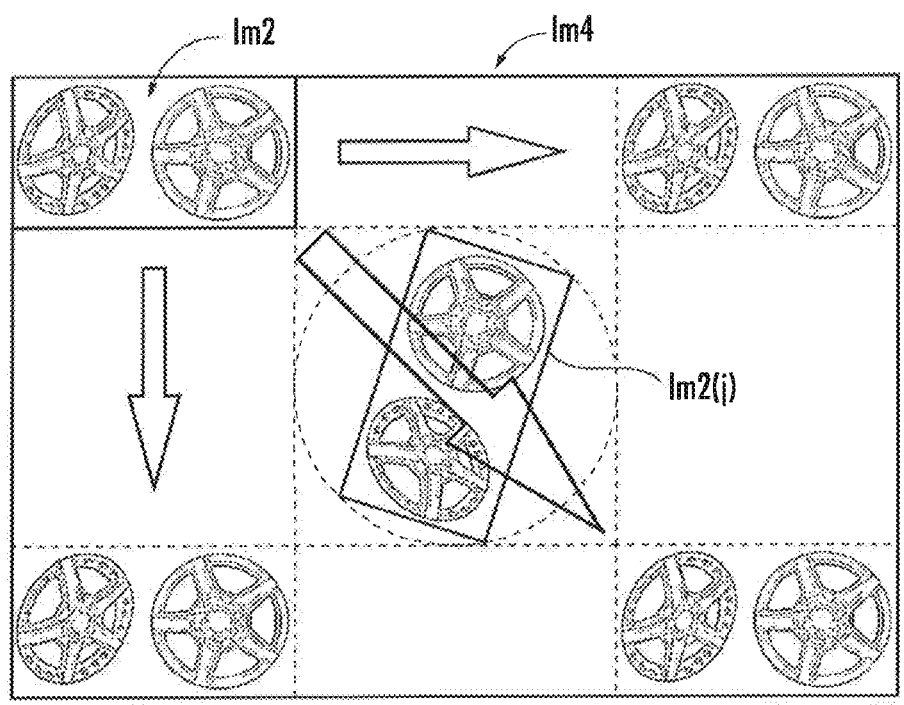
FIG. 16B is a diagram relates to the specific point detection process and illustrates a matching process.

As illustrated in FIG. 16B, the specific point detection unit 112 moves the edge image Im2 relative to the specific point detection reference image Im4 (rotated image Im2(j)), using the edge image Im2 as a probe image and the specific point detection reference image Im4 as a search target image.

Then, the specific point detection unit 112 performs a matching operation of calculating a correlation value cim(j) at each relative position between the edge image Im2 and the rotated image Im2(j).

Figure 17A:
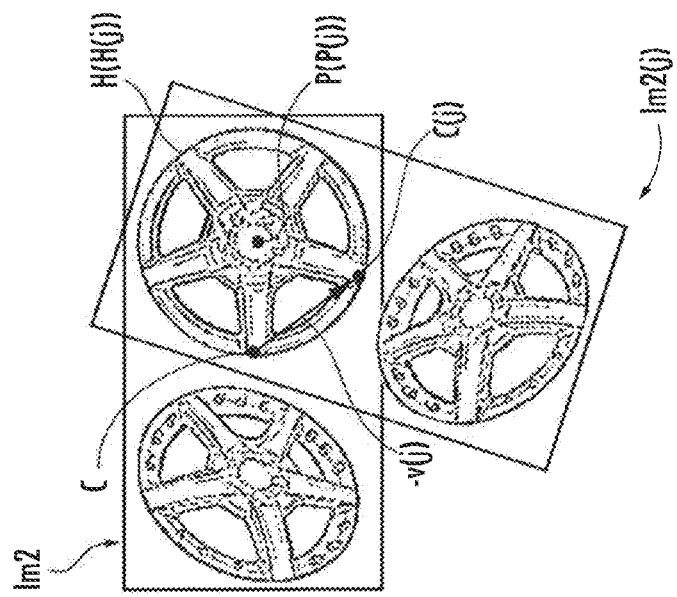
FIG. 17A is a diagram relates to the specific point detection process and illustrates a positional relationship between the center points of each image when objects overlap each other.

For example, the specific point detection unit 112 a deviation vector −v(j) indicating the size and direction of deviation between the image center point C of the edge image Im2 and the image center point C(j) of the rotated image Im2(j) when the correlation value cim(j) between the edge image Im2 and the rotated image Im2(j) is the maximum, as illustrated in FIG. 17A, and stores the deviation vector in the storage unit 200 (FIG. 6/STEP110).

The correlation value cim(j) and the deviation vector −v(j) are calculated by a matching program based on the well-known fast Fourier transform.

For example, as the matching program, a program is used which calculates the correlation between the brightness values of the edge image Im2 and the rotated image Im2(j) at a high speed using a "convolution theorem". Specifically, the matching operation used in this embodiment is implemented by giving a CV_TM_CCORR_NORMED option to a MatchTemplate function of a general-purpose image processing library OpenCV.

The specific point detection unit 112 determines whether there is an unprocessed N-angle candidate θ(j) (FIG. 6/STEP112). When the determination result is positive (FIG. 6/STEP112: YES), the specific point detection unit 112 performs the process after STEP104 in FIG. 6 again.

When the determination result is negative (FIG. 6/STEP112: NO), the specific point detection unit 112 calculates the coordinate value of the specific point P defined on the edge image Im2, using the following Expression 1, on the basis of the N-angle candidate θ(j) where the correlation value cim(j) is the maximum and the deviation vector v(j) (FIG. 6/STEP114):

$$\begin{bmatrix} p_1 \\ p_2 \end{bmatrix} = \begin{bmatrix} c_1 \\ c_2 \end{bmatrix} + [Rot\alpha]\begin{bmatrix} R \\ 0 \end{bmatrix} - \frac{v(j)}{2} \qquad \text{[Expression 1]}$$

where $p_1$: the x-axis coordinate value of P
$p_2$: the y-axis coordinate value of P
$c_1$: the x-axis coordinate value of C
$c_2$: the y-axis coordinate value of C
[Rot α]: a rotation matrix of angle α

$$R = \frac{|v(j)|}{2\tan\frac{\theta}{2}}$$

α: an angle formed between v(j) and $$\begin{bmatrix} 0 \\ 1 \end{bmatrix}.$$

A coordinate system which is defined on the edge image Im2 is defined by two axes, that is, the x-axis and the y-axis perpendicular to the x-axis.

Expression 1 corresponds to a "geometric model indicating a relative positional relationship between a first point (specific point P) and a second point (image center point C) in the original image". Alternatively, the specific point detection unit 112 may detect the position of the first point (specific point P) with reference to, for example, a table indicating the position of C, the rotation angle θ(j), the deviation vector v(j), and the positional relationship between the first point (specific point P) and the second point (image center point C).

Figure 17B:
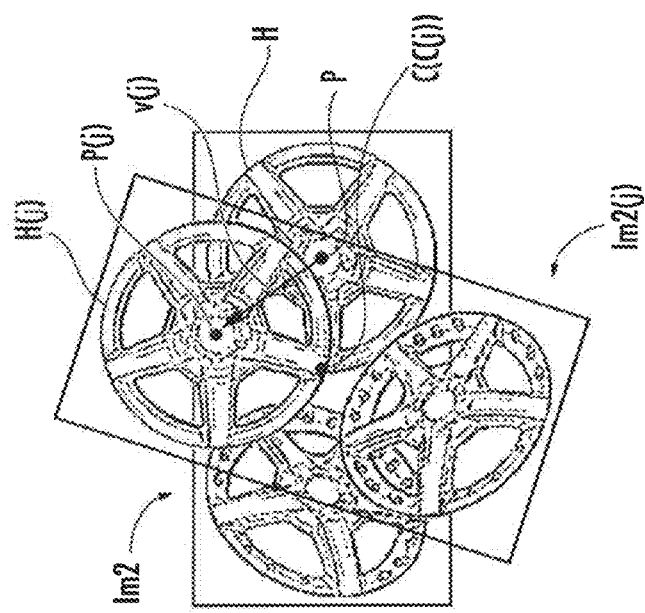
FIG. 17B is a diagram relates to the specific point detection process and illustrates a positional relationship between specific points when the center points of each image overlap each other.

The geometric meaning of the above-mentioned expression will be supplementarily described with reference to FIGS. 17A to 17C.

As illustrated in FIG. 17A, the image region H of the object in the edge image Im2 is substantially matched with the image region H(j) of the object in the rotated image Im2(j) at a given angle θ(j) from the rotational symmetry of the object. In this case, the correlation value cim(j) is the maximum.

The deviation between the image center point C of the edge image Im2 and the rotation center point C(j) of the rotated image Im2(j) at that time is represented by −v(j). In this case, as illustrated in FIG. 17B, when the image center point C of the edge image Im2 and the rotation center point C(j) of the rotated image Im2(j) overlap each other, the deviation between the specific point P on the edge image Im2 and the specific point P(j) on the rotated image Im2(j) is represented by v(j).

Figure 17C:
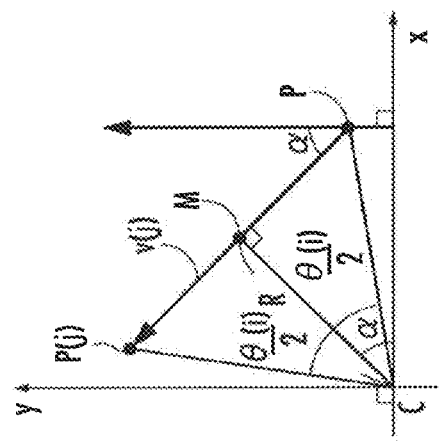
FIG. 17C is a diagram relates to the specific point detection process and illustrates a relationship between the amount of rotation and a deviation vector, and the specific point.

Since the rotation angle of the rotated image Im2(j) is θ(j), a triangle having the points C, P, and P(j) as vertexes is an isosceles triangle in which the angle of a vertex C is θ(j), as illustrated in FIG. 17C. Since the points C, P, and P(j) are the vertexes of the isosceles triangle, a segment connecting a midpoint M of a line P-P(j) and the vertex C is perpendicular to the line P-P(j) (vector v(j)). Therefore, when the angle formed between the line P-P(j) (vector v(j)) and a line which passes through the point P and is parallel to the y-axis is a, the angle formed between the x-axis and a segment C-M is α.

In this case, the coordinate value of the midpoint M of the side P-P(j) is calculated by the following Expression 2.

$$\begin{bmatrix} c_1 \\ c_2 \end{bmatrix} + [Rot\alpha]\begin{bmatrix} R \\ 0 \end{bmatrix}. \qquad \text{[Expression 2]}$$

Since the specific point P is moved from the above-mentioned midpoint by −v(j)/2, the coordinate value of the specific point P is represented by the above-mentioned Expression 1.

The specific point detection unit 112 outputs the coordinate value (central coordinate information) of the specific point P to the object region determination unit 113, the object image generation unit 114, and the storage unit 200 (FIG. 6/STEP116).

Figure 18A:
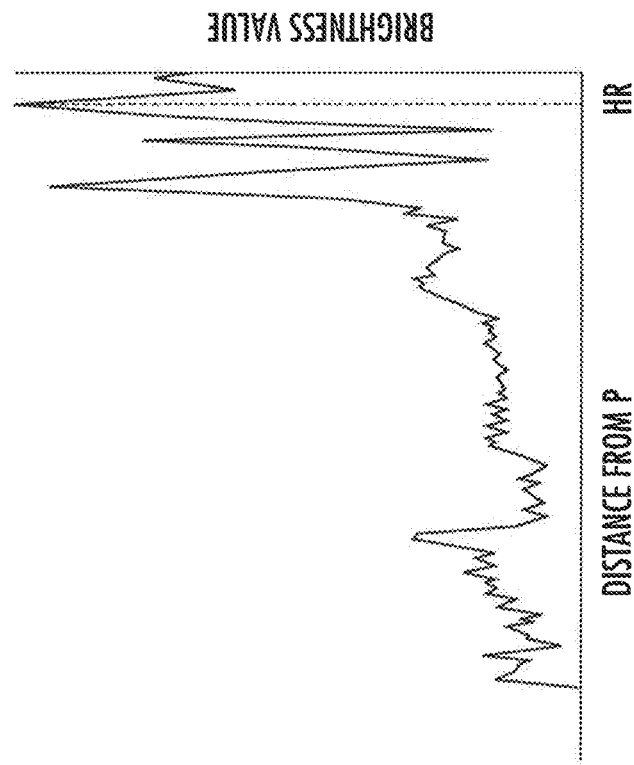
FIG. 18A is a diagram relates to an object region specifying process and illustrates an edge image of the object.
Figure 18B:
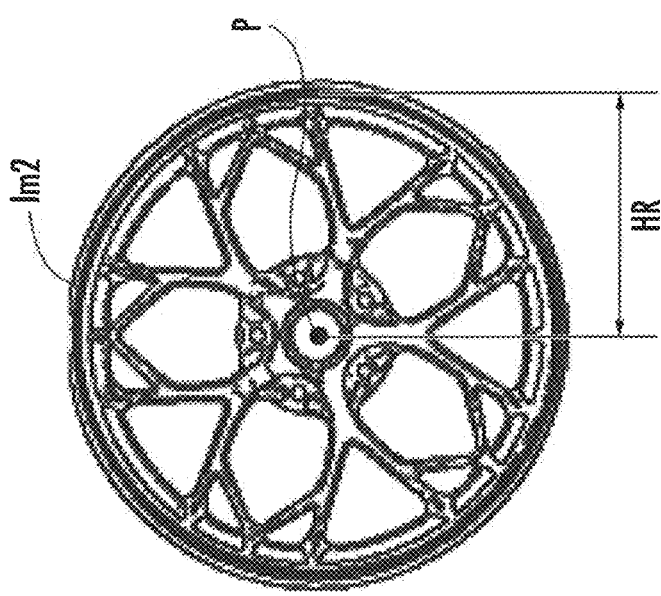
FIG. 18B is a diagram relates to the object region specifying process and illustrates a histogram of brightness values for each distance from the specific point.

The object region determination unit 113 creates a histogram of the brightness values of each pixel for each distance from the specific point P from the edge image Im2 illustrated in FIG. 18A, as illustrated in FIG. 18B (FIG. 6/STEP118).

The object region determination unit 113 outputs the maximum radius value in the histogram as the radius value (region information (effective radius)) HR of the object to the object image generation unit 114 and the storage unit 200 (FIG. 6/STEP120).

The range defined by the coordinate value of the specific point P and the radius value HR corresponds to a "range of a designated image region" according to the invention.

The object region determination unit 113 may output a predetermined radius value as the region information of the image region H of the object. Instead of the radius, the object region determination unit 113 may output information (for example, information about the coordinate value of the outer edge of the image) for determining the outer edge of the image region H of the object.

Figure 19A:
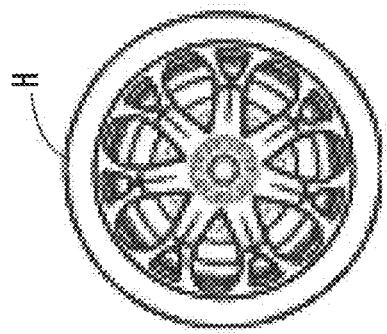
FIG. 19A is a diagram relates to an object image region extraction process and illustrates the edge image of the object.
Figure 19B:
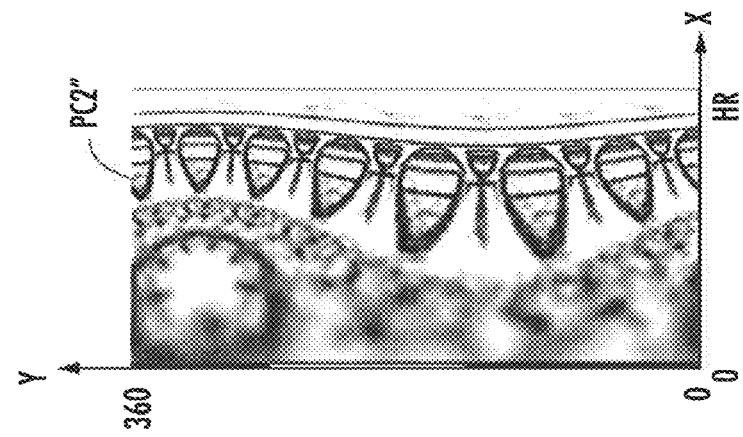
FIG. 19B is a diagram relates to the object image region extraction process and illustrates a polar coordinate expansion image obtained by the process according to this embodiment.

The object image generation unit 114 generates a polar coordinate expansion image PC1 of the original image Im1 and a polar coordinate expansion image PC2 of the edge image Im2 illustrated in FIG. 19B from the original image Im1 and the edge image Im2 illustrated in FIG. 19A, on the basis of the specific point P and the radius value HR of the object, and outputs the generated images to the image feature classification unit 120 and the design feature information acquisition unit 130 (FIG. 6/STEP122).

The polar coordinate expansion image PC2 of the edge image Im2 is illustrated in FIG. 19B. In the following description, a radial direction having the specific point P as the center is referred to as the first axis (X-axis) of the polar coordinate expansion images PC1 and PC2 and a circumferential direction having the specific point P as the center is referred to as the second axis (Y-axis) of the polar coordinate expansion images PC1 and PC2.

A coordinate value on the X-axis corresponds to a radius from the specific point P and is equal to or greater than zero and less than the radius value HR. A coordinate value on the Y-axis corresponds to a rotation angle with respect to the specific point P and is equal to or greater than zero and less than 360.

Figure 19C:
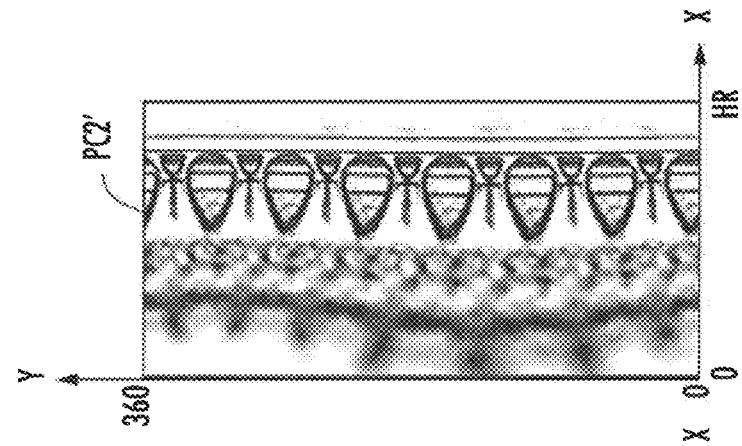
FIG. 19C is a diagram relates to the object image region extraction process and illustrates the polar coordinate expansion image when it is difficult to accurately specify the position of the specific point.
Figure 19D:
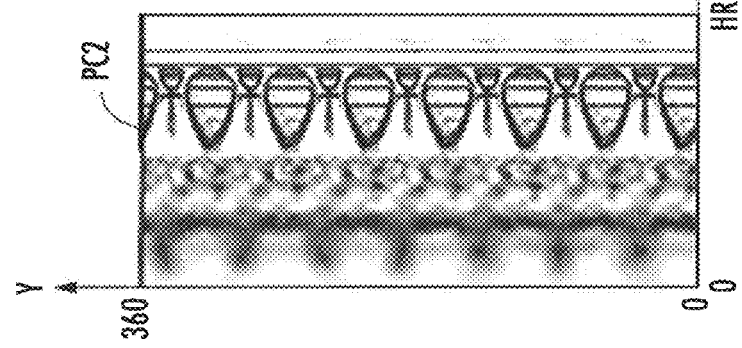
FIG. 19D is a diagram relates to the object image region extraction process and illustrates the polar coordinate expansion image when it is difficult to accurately specify the position of the specific point.

In this embodiment, since the specific point P is accurately detected, the polar coordinate expansion image is appropriately detected as illustrated in FIG. 19B. When the specific point P is not accurately detected, polar coordinate expansion images PC' and PC" are distorted as illustrated in FIGS. 19C and 19D, which makes it difficult to perform the subsequent process.

In this way, the object image region extraction process ends.

(Image Feature Classification Process)

The process of the image feature classification unit 120 will be described with reference to the flowcharts illustrated in FIGS. 7 to 9.

Figure 7:
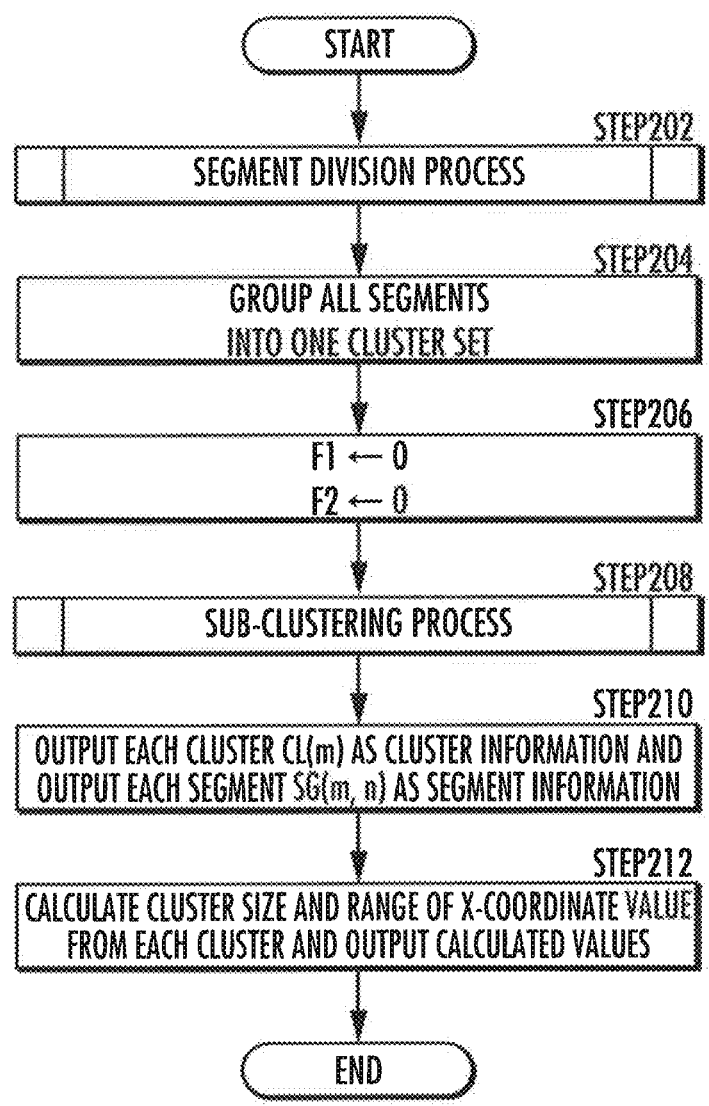
FIG. 7 is a flowchart illustrating an image feature classification process.

As illustrated in FIG. 20A, the segment division unit 121 performs a segment division process (see FIG. 8) which divides the polar coordinate expansion image PC2 of the edge image Im2 into a plurality of regions which are surrounded by a boundary line with a high brightness value and defines the divided regions as segments SG(n) (SG(n1) to SG(n4) in FIG. 20A) (FIG. 7/STEP202). The segment division process will be described below.

The clustering unit 122 groups the segments SG(n) defined by the segment division unit 121 into one sub-cluster set (FIG. 7/STEP204).

The clustering unit 122 initializes a sub-clustering process count variable F1 for counting the number of times a sub-clustering process is performed and a recursive combination determination variable F2 for determining whether there is a cluster combination process in a recursive process (sets an initial value to zero) (FIG. 7/STEP206).

The clustering unit 122 performs a sub-clustering process (see FIG. 9) of recursively combining clusters CL(m), which are components of the sub-cluster set defined in STEP204, for the sub-cluster set (FIG. 7/STEP208). The sub-clustering process will be described below.

The clustering unit 122 outputs the clusters CL(m) created by the sub-clustering process as cluster information and the segments SG(m, n) as segment information to the design feature information acquisition unit 130 (FIG. 7/STEP210).

The clustering unit 122 calculates, from each cluster CL(m), the size of each cluster and the ranges of the X-coordinate values of the segments SG(m, n) belonging to each cluster CL(m) and stores the calculated values in the storage unit 200 (FIG. 7/STEP212).

The pixels of the polar coordinate expansion image PC2 of the edge image Im2 are classified into the segments SG(m, n) of each cluster CL(m) by the above-mentioned process, as illustrated in FIG. 20B.

(Segment Division Process)

Next, the segment division process will be described in detail with reference to FIG. 8.

Figure 8:
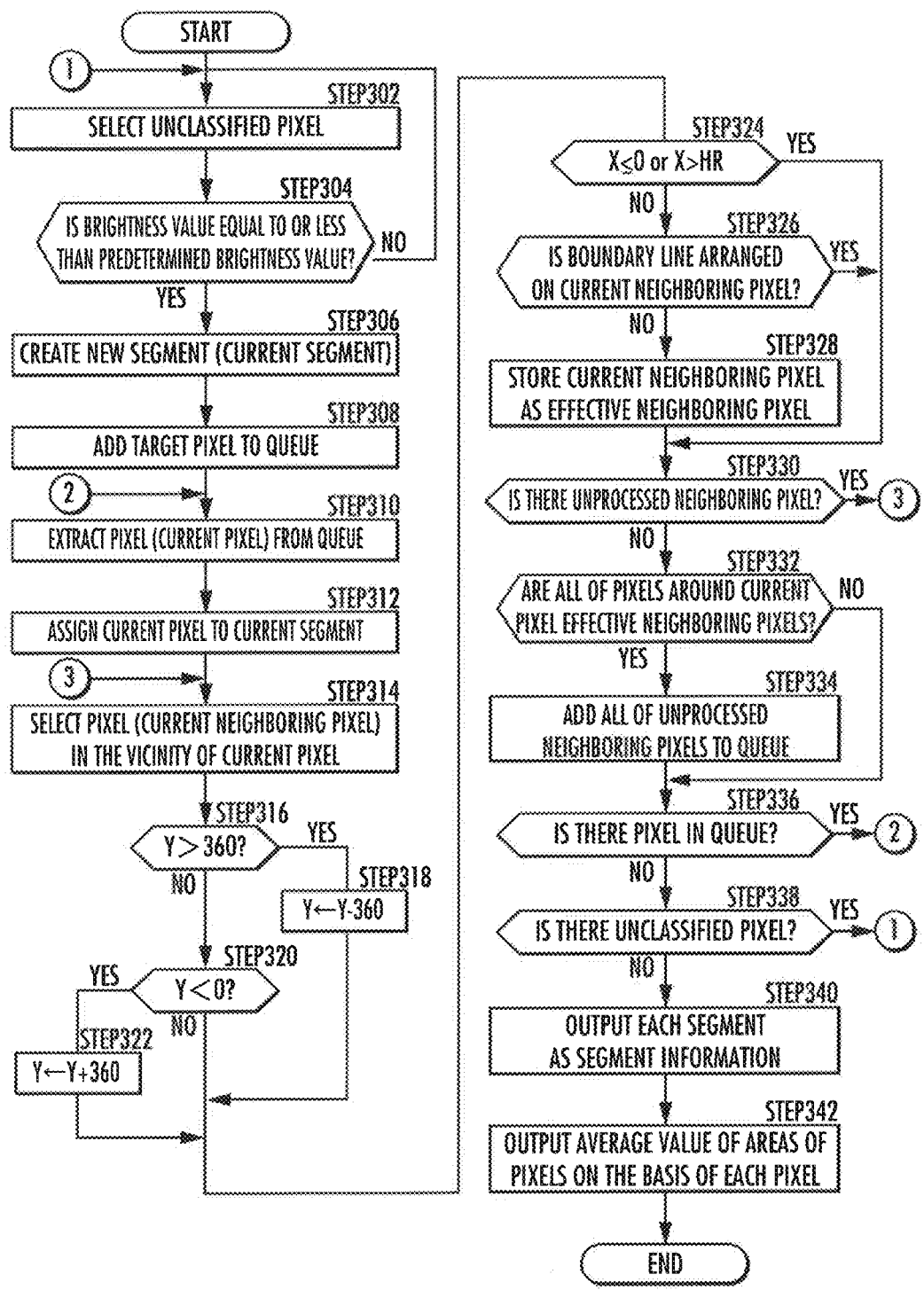
FIG. 8 is a flowchart illustrating a segment division process.

The segment division unit 121 selects one unclassified pixel PX(P) among the pixels included in the polar coordinate expansion image PC2 of the edge image Im2 (FIG. 8/STEP302).

The segment division unit 121 determines whether the brightness value of the pixel PX(P) is equal to or less than a predetermined brightness value (FIG. 8/STEP304).

When the determination result is negative (FIG. 8/STEP304: NO), the segment division unit 121 performs the process in SETP302 of FIG. 8 again. When the determination result in SETP304 of FIG. 8 is "No", the probability of the pixel PX(P) being arranged on the boundary line between a given component and another component is high since the target is the edge image Im2.

When the determination result is positive (FIG. 8/STEP304: YES), the segment division unit 121 creates a new segment (hereinafter, referred to as a "current segment") (FIG. 8/STEP306).

The segment division unit 121 adds the selected pixel PX(P) to a width search queue (FIG. 8/STEP308).

The segment division unit 121 extracts a pixel (hereinafter, referred to as a current pixel) from the width search queue (FIG. 8/STEP310).

The segment division unit 121 assigns the current pixel to the current segment (FIG. 8/STEP312).

The segment division unit 121 selects one (hereinafter, referred to as a current neighboring pixel) of the pixels (for example, pixels included in a 3×3 mass) which are arranged around the current pixel (FIG. 8/STEP314). This selection process is performed by adding or subtracting a value in a predetermined range to or from the coordinate value of the current pixel.

For example, as illustrated in FIG. 20C, when the current pixel is a pixel PX(P1), a pixel PX(P2) which is arranged in a region ad1 around the current pixel is selected as the current neighboring pixel.

When the current pixel is a pixel PX(P3), pixels PX(P4) and PX(P5) which are arranged in a region ad2 around the current pixel PX(P3) are selected.

The segment division unit 121 determines whether the Y-axis (circumferential direction) coordinate value of the current neighboring pixel is greater than 360 (the maximum value of the Y-axis coordinate value) (FIG. 8/STEP316). In other words, the segment division unit 121 determines whether the coordinate value which exceeds the upper end of the polar coordinate expansion image PC has been selected as the current neighboring pixel.

When the determination result is positive (FIG. 8/STEP316: YES), the segment division unit 121 sets a value obtained by subtracting 360 (the maximum value of the Y-axis coordinate value) from the Y-axis (circumferential direction) coordinate value of the current neighboring pixel as a new Y-axis (circumferential direction) coordinate value of the current neighboring pixel (FIG. 8/STEP318). In this way, a pixel which is arranged in the vicinity of the lower end of the polar coordinate expansion image PC is selected as the current neighboring pixel.

When the determination result is negative (FIG. 8/STEP316: NO), the segment division unit 121 determines whether the Y-axis (circumferential direction) coordinate value of the current neighboring pixel is less than 0 (the minimum value of the Y-axis coordinate value) (FIG. 8/STEP320). In other words, the segment division unit 121 determines whether the coordinate value exceeding the lower end of the polar coordinate expansion image PC has been selected as the current neighboring pixel.

When the determination result is positive (FIG. 8/STEP320: YES), the segment division unit 121 sets a value obtained by adding 360 (the maximum value of the Y-axis coordinate value) to the Y-axis (circumferential direction) coordinate value of the current neighboring pixel as a new Y-axis (circumferential direction) coordinate value of the current neighboring pixel (FIG. 8/STEP322). In this way, a pixel which is arranged in the vicinity of the upper end of the polar coordinate expansion image PC is selected as the current neighboring pixel.

The pixels in the vicinity of the upper and lower ends of the polar coordinate expansion image PC are connected and processed by the process in STEP316 to STEP322.

After the process in any one of STEP318 to STEP322, the segment division unit 121 determines whether the X-coordinate value of the current neighboring pixel is less than 0 or greater than HR (FIG. 8/STEP324). In other words, the segment division unit 121 determines whether the coordinate value exceeding the upper or lower end of the polar coordinate expansion image PC has been selected as the current neighboring pixel.

When the determination result is negative (FIG. 8/STEP324: NO), the segment division unit 121 determines whether the brightness value of each pixel is equal to or greater than a predetermined brightness value to determine whether the current neighboring pixel is arranged on the boundary line (FIG. 8/STEP326).

For example, as illustrated in FIG. 20C, when the brightness values of the current neighboring pixels PX(P2) and PX(P4) are less than the predetermined brightness value (when the current neighboring pixels PX(P2) and PX(P4) are illustrated in white in FIG. 20C), the pixels are determined to be arranged on the boundary line and the determination result is "No".

In contrast, when the brightness value of a current neighboring pixel PX(P5) is equal to or greater than the predetermined brightness value (the current neighboring pixel PX(P5) is colored in FIG. 20C), the determination result is "Yes".

When the determination result is negative (FIG. 8/STEP326: NO), the segment division unit 121 stores the current neighboring pixel as an effective neighboring pixel (FIG. 8/STEP328).

In FIG. 20C, while the pixels PX(P2) and PX(P4) are stored as the effective neighboring pixels, the pixel PX(P5) is not stored as the effective neighboring pixel.

When the determination result in STEP324 is "Yes" (FIG. 8/STEP324: YES), when the determination result in STEP326 is "Yes" (FIG. 8/STEP326: YES), or after STEP328, the segment division unit 121 determines whether there is an unprocessed neighboring pixel (FIG. 8/STEP330).

When the determination result is positive (FIG. 8/STEP330 . . . YES), the segment division unit 121 performs the process after STEP314 again.

When the determination result is negative (FIG. 8/STEP330: NO), the segment division unit 121 determines whether all of the pixels around the current pixel are the effective neighboring pixels (FIG. 8/STEP332).

When the determination result is positive (FIG. 8/STEP332: YES), the segment division unit 121 adds all of the pixels around the current pixel to the width search queue (FIG. 8/STEP334).

For example, as illustrated in FIG. 20C, since none of the pixels in the region ad1 around the current pixel PX(P1) are arranged on the boundary line, the pixels are stored as the effective neighboring pixels in STEP326 to STEP328 of FIG. 8. Therefore, all of the pixels around the current pixel PX(P1) are added to the width search queue and belong to the current segment in STEP312.

The pixels in the region ad2 around the current pixel PX(P3) include the effective neighboring pixel, such as the pixel PX(P4), and a non-effective neighboring pixel, such as the pixel PX(P5). In this case, not all of the pixels around the current pixel PX(P1) are added to the width search queue in this process.

As a result, when there is a very small cut portion, such as the pixel PX(P4), on the boundary line, the cut portion is not separated into the current segment. That is, even when a boundary line has a very small cut portion, the boundary line including the cut portion is regarded as one boundary line. Therefore, the segments are appropriately classified by the above-mentioned process.

Returning to FIG. 8, when the determination result in STEP332 of FIG. 8 is "No" (FIG. 8/STEP332: NO) or after STEP334 of FIG. 8, the segment division unit 121 determines whether the width search queue includes the pixel PX(P) (FIG. 8/STEP336).

When the determination result is positive (FIG. 8/STEP336: YES), the segment division unit 121 performs the process after STEP310. In this way, the neighboring pixels added in STEP334 are separated into the same segment as the current pixel, as described above.

When the determination result is negative (FIG. 8/STEP336: NO), the segment division unit 121 determines whether there is an unclassified pixel (FIG. 8/STEP338).

When the determination result is positive (FIG. 8/STEP338: YES), the segment division unit 121 performs the process after STEP302.

In this way, when the pixels in the width search queue are removed and there is an unclassified pixel, the unclassified pixel is separated into the new segment created in STEP306 in STEP312.

That is, the effective neighboring pixel is added to the width search queue in STEP334 and is separated into the current segment. The pixel which is arranged in a region different from that including the current pixel by the boundary line is not added to the width search queue in STEP334. Therefore, the pixel is separated into a segment different from the current segment.

When the determination result in STEP338 of FIG. 8 is "No" (FIG. 8/STEP338: NO), the segment division unit 121 outputs each segment SG(n) as segment information to the clustering unit 122 (FIG. 8/STEP340).

The segment division unit 121 stores the average value of the areas of the segments SG(n) in the storage unit 200 (FIG. 8/STEP342).

(Sub-Clustering Process)

Next, the sub-clustering process will be described with reference to FIG. 9.

Figure 9:
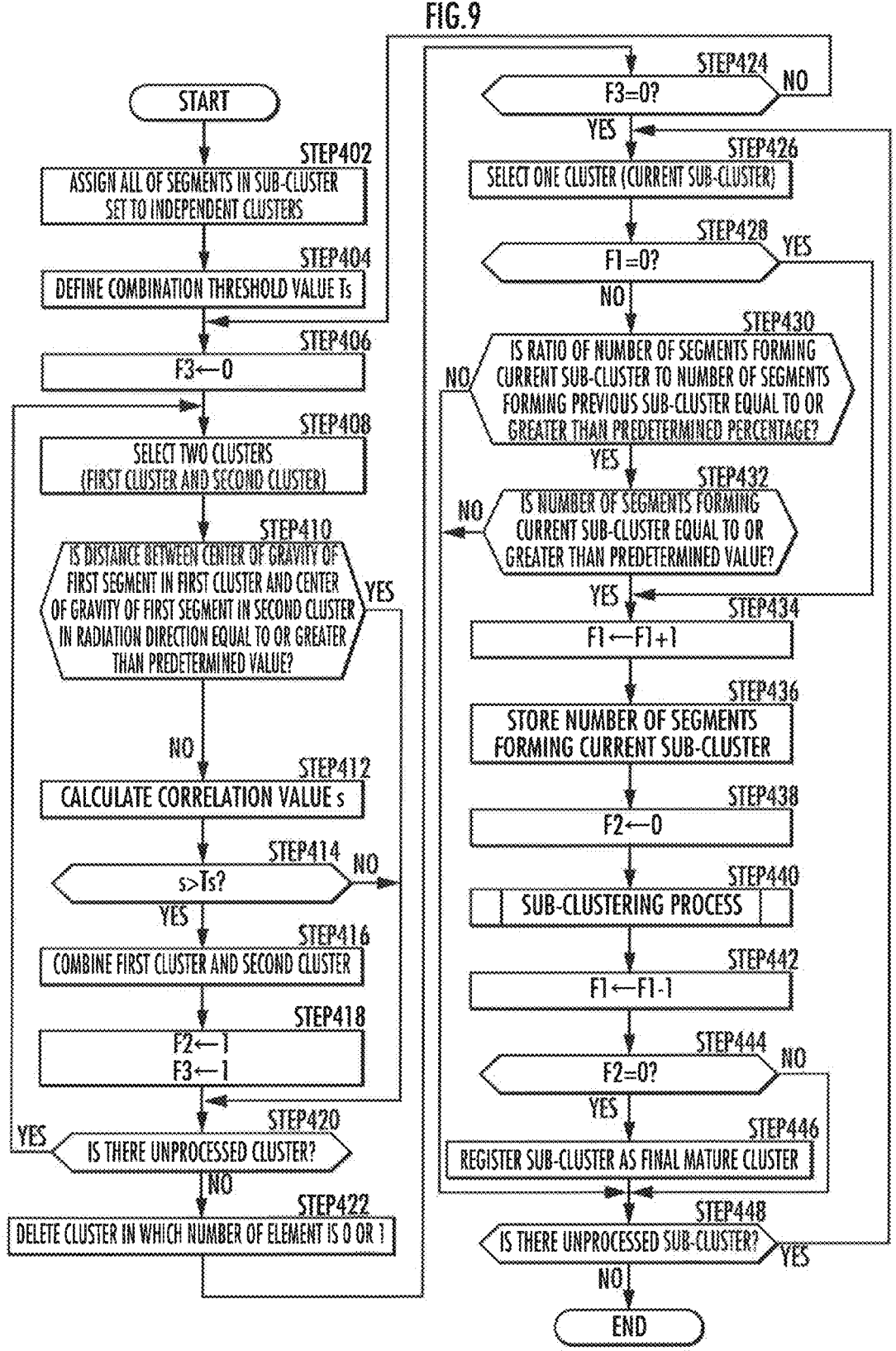
FIG. 9 is a flowchart illustrating a sub-clustering process.

First, the clustering unit 122 assigns all of the segments SG in one sub-cluster set to independent clusters (FIG. 9/STEP402).

The clustering unit 122 defines a combination threshold value Ts such that, as the sub-clustering process count variable F1 increases, the combination threshold value Ts increases in a range which is set in order to ensure the identity between the segments (FIG. 9/STEP404).

The clustering unit 122 initializes a combination determination variable F3 for determining whether the clusters are combined (an initial value:0) (FIG. 9/STEP406).

The clustering unit 122 selects two clusters (hereinafter, referred to as a "first cluster" and a "second cluster") among the clusters created in STEP402 (FIG. 9/STEP408).

The clustering unit 122 determines whether a distance between the position of the center of gravity of a first segment in the first cluster and the position of the center of gravity of a first segment in the second cluster in a radial direction is equal to or greater than a predetermined distance (FIG. 9/STEP410). The first segment in the cluster means a segment having the minimum (or the maximum) Y-axis coordinate value of the position of the center of gravity among the segments belonging to the cluster. Instead of the first segment, a segment may be randomly selected from each cluster and the positions of the centers of gravity of the segments may be compared with each other.

Here, the predetermined distance is set such that it decreases as the sub-clustering process count variable F1 increases.

When the determination result is negative (FIG. 9/STEP410: NO), the clustering unit 122 performs a matching operation using one of two clusters as the probe image and the other cluster as the search target image to calculate the correlation value s between the shapes and sizes of the first cluster and the second cluster (FIG. 9/STEP412).

The clustering unit 122 determines whether the correlation value s is greater than the combination threshold value Ts (FIG. 9/STEP414).

When the determination result is positive (FIG. 9/STEP414: YES), the clustering unit 122 combines the first cluster and the second cluster (FIG. 9/STEP416). The combination between the first cluster and the second cluster means, for example, a process which adds one of the two clusters to the other cluster such that the one cluster is empty and belongs to a new cluster.

The clustering unit 122 sets the recursive combination determination variable F2 and the combination determination variable F3 to 1 (FIG. 9/STEP418).

When the determination result in STEP410 is "Yes", when the determination result in STEP414 is "No" (FIG. 9/STEP410: YES or FIG. 9/STEP414: NO), or after STEP418, the clustering unit 122 determines whether there is an unprocessed cluster (FIG. 9/STEP420).

When the determination result is positive (FIG. 9/STEP420: YES), the clustering unit 122 performs the process after STEP408.

When the determination result is negative (FIG. 9/STEP420: NO), the clustering unit 122 deletes the cluster in which the number of elements (the number of segments belonging to the cluster) is 0 or 1 (FIG. 9/STEP422).

The clustering unit 122 determines whether the combination determination variable F3 is zero (FIG. 6/STEP424).

The combination determination variable F3 is determined in STEP406 and is set to 1 in STEP418 when the process of combining the first cluster and the second cluster (FIG. 9/STEP416) has been performed. That is, the combination determination variable F3 is a value indicating whether the process of combining the first cluster and the second cluster has ever been performed in STEP408 to STEP420.

That is, in STEP424, the clustering unit 122 determines whether the process of combining the first cluster and the second cluster has ever been performed in STEP408 to STEP420.

When the determination result is negative (FIG. 9/STEP424: NO), the clustering unit 122 performs the process after STEP406.

When the determination result is positive (FIG. 9/STEP424: YES), the clustering unit 122 selects the cluster (hereinafter, referred to as a current sub-cluster) newly defined in STEP402 to STEP424 (FIG. 9/STEP426).

The clustering unit 122 determines whether the sub-clustering process count variable F1 is zero (FIG. 9/STEP428).

The sub-clustering process count variable F1 is initialized in STEP206 of FIG. 7 and 1 is added to the sub-clustering process count variable F1 before the sub-clustering process is recursively called in STEP434. Then, the sub-clustering process count variable F1 is reduced by 1 in STEP442 after a process of recursively calling the sub-clustering process in STEP440 is completed. As a result, the sub-clustering process count variable F1 indicates the number of recursive calls (the number of calls) of the sub-clustering process for the current sub-cluster in the sub-clustering process of STEP440.

That is, in STEP428, the clustering unit 122 determines whether the process of combining the first cluster and the second cluster has ever been performed in the sub-clustering process for the current sub-cluster.

When the determination result is negative (FIG. 9/STEP428: NO), the clustering unit 122 determines whether the ratio of the number of segments forming the current sub-cluster is equal to or greater than a predetermined percentage (for example, 50 percent) of the number of segments forming the previous sub-cluster stored in STEP436 (FIG. 9/STEP430).

When the determination result is positive (FIG. 9/STEP430: YES), the clustering unit 122 determines whether the number of segments forming the current sub-cluster is equal to or greater than a predetermined value (for example, 2) (FIG. 9/STEP432).

When the determination result in STEP428 of FIG. 9 is "Yes" (FIG. 9/STEP428: YES) or when the determination result in STEP432 of FIG. 9 is "Yes" (FIG. 9/STEP432: YES), the clustering unit 122 adds 1 to the sub-clustering process count variable F1 (FIG. 9/STEP434) and stores the number of segments forming the current sub-cluster in the storage unit 200 (FIG. 9/STEP436).

The clustering unit 122 initializes the recursive combination determination variable F2 (an initial value: 0) (FIG. 9/STEP438). The clustering unit 122 recursively performs the sub-clustering process for the current sub-cluster (FIG. 9/STEP440).

The clustering unit 122 subtracts 1 from the sub-clustering process count variable F1 (FIG. 9/STEP442).

The clustering unit 122 determines whether the recursive combination determination variable F2 is zero (FIG. 9/STEP444). The recursive combination determination variable F2 is initialized before the sub-clustering process is recursively called (see FIG. 9/STEP438). When the process of combining the first cluster and the second cluster (FIG. 9/STEP416) in the recursive sub-clustering process is performed, the recursive combination determination variable F2 is set to 1 in STEP418. Therefore, it is possible to check whether the process of combining the first cluster and the second cluster (FIG. 9/STEP416) in the recursive sub-clustering process has been performed with reference to the recursive combination determination variable F2.

When the determination result in STEP444 of FIG. 9 is "Yes" (FIG. 9/STEP444: YES), the clustering unit 122 registers the current sub-cluster as a final mature cluster (a cluster which does not need to be subjected to the sub-clustering process any more) in the storage unit 200 (FIG. 9/STEP446).

When the determination result in STEP430, STEP432, or STEP444 of FIG. 9 is "No" (FIG. 9/STEP430: NO, FIG. 9/STEP432: NO, or FIG. 9/STEP444: NO), or after STEP446 in FIG. 9, the clustering unit 122 determines whether there is an unprocessed sub-cluster (FIG. 9/STEP448).

When the determination result is positive (FIG. 9/STEP448: YES), the clustering unit 122 performs the process after STEP426. On the other hand, when the determination result is negative (FIG. 9/STEP448: NO), the clustering unit 122 ends the sub-clustering process.

According to this sub-clustering process, as the sub-clustering process count variable F1 increases, the combination threshold value Ts increases and the predetermined distance in STEP410 is reduced. That is, whenever recursive processing is repeated, classification conditions become severe (FIG. 9/STEP404 and STEP410). Therefore, as illustrated in FIG. 20B, the segments SG(n) (in FIG. 20B, SG(1) to SG(n4)) are accurately separated into the cluster CL(m) (in FIG. 20B, CL(m1) or CL(m2)) according to shape, size, and arrangement position. Hereinafter, the segments belonging to the cluster CL(m) are referred to as segments SG(m, n) (in FIG. 20B, SG(m1, n1) to SG(m2, n4)).

(Design Feature Information Calculation Process)

Next, the design feature information calculation process of (each component of) the design feature information acquisition unit 130 will be described with reference to FIGS. 10 to 13.

Figure 10:
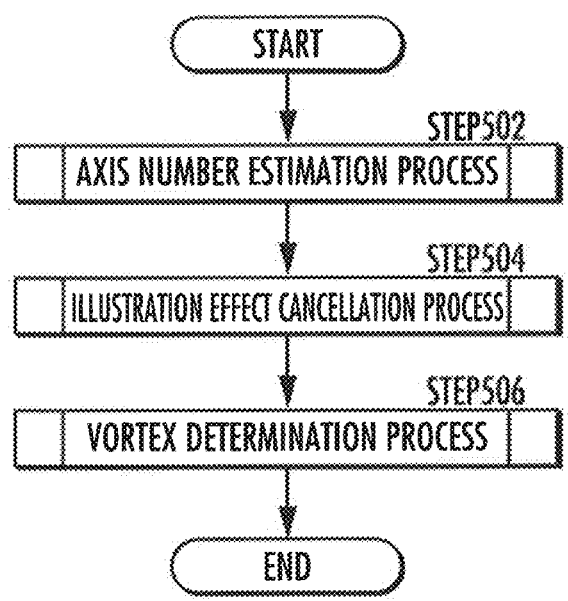
FIG. 10 is a flowchart illustrating a design feature information calculation process.

The axis number estimation unit 131 performs an axis number estimation process (see FIGS. 11A and 11B) of estimating the number of axes of the object which indicates the properties of the rotational symmetry of the image region H of the object (FIG. 10/STEP502). The axis number estimation process will be described below.

The illumination effect cancellation unit 132 performs an illumination effect cancellation process (see FIG. 12) which performs frequency filtering, on the basis of the estimated number of axes EN output from the axis number estimation unit 131, to cancel the illumination effect of (the polar coordinate expansion image PC1 of the original image Im1 in) the object image PC (in FIG. 23, PC', PC'', and PC''') and reconstructs an illumination-effect canceled polar coordinate expansion image CPC (in FIG. 23, CPC', CPC'', and CPC'''), as illustrated in FIG. 23 (FIG. 10/STEP504). The illumination effect cancellation process will be described.

The vortex determination unit 133 performs a vortex determination process (see FIG. 13) of determining whether each component CE(q) of the object is a non-vortex image which is symmetric with respect to a straight line L(q) parallel to the radial direction or a vortex image which is not symmetric with respect to the straight line, on the basis of the polar coordinate expansion image CPC subjected to the illumination effect cancellation process (FIG. 10/STEP506). The vortex determination process will be described.

(Axis Number Estimation Process)

Next, the axis number estimation process of the axis number estimation unit 131 will be described with reference to FIGS. 11A and 11B.

The axis number estimation unit 131 selects one unprocessed cluster CL(mc) (hereinafter, referred to as the "current cluster") from one or a plurality of clusters output from the clustering unit 122 (FIG. 11A/STEP602). The axis number estimation unit 131 determines whether the number of segments forming the current cluster CL(mc) is less than a predetermined value (for example, 3) (FIG. 11A/STEP604).

When the determination result is positive (FIG. 11A/STEP604: YES), the axis number estimation unit 131 performs STEP602 again.

When the determination result is negative (FIG. 11A/STEP604: NO), the axis number estimation unit 131 acquires the minimum value Ymin(mc, n) (in FIG. 21A, Ymin(mc, nc1 to nc4) of the Y-axis coordinate value of each segment SG(mc, n) (in FIG. 21A, segments SG(mc, nc1 to nc4)) from each segment SG(mc, n) belonging to the current cluster CL(mc), as illustrated in FIG. 21A (FIG. 11A/STEP606).

The axis number estimation unit 131 calculates a set (in FIG. 21, Yd(mc, nc1) to Yd(mc, nc3)) of YDIFF values Yd(mc, n) (=Yd(mc, nc2)−Yd(mc, nc1)), which are differences between the minimum values Ymin(mc, n) and Ymin(mc, n+1) of the Y-axis coordinate values of adjacent segments SG(mc, n) and SG(mc, n+1), on the basis of the minimum values Ymin(mc, n) of the Y-axis coordinate values (in FIG. 21, Ymin(mc, nc1 to nc4) (FIG. 11A/STEP608).

Then, the axis number estimation unit 131 initializes the supposed number of axes AN(mc, AN) (initial value: 2) for the current cluster CL(mc) (FIG. 11A/STEP610). Here, the number of axes is the maximum value of A when the object is rotationally symmetric A times and the initial value of the supposed number of axes is determined according to the properties of the object.

The axis number estimation unit 131 determines the permitted number of missing segments AU(AN), which is the permitted value of the number of missing segments, on the basis of the supposed number of axes AN (FIG. 11A/STEP612). For example, the permitted number of missing segments AU(AN) is defined as a value obtained by rounding the product of the supposed number of axes AN and a predetermined percentage to the nearest whole number.

The axis number estimation unit 131 calculates a value obtained by dividing 360 (the maximum value of the Y-axis coordinate value) by the supposed number of axes AN as an ideal angle IDA(AN) at the supposed number of axes (FIG. 11A/STEP614).

The axis number estimation unit 131 initializes the sum SL_da(mc, AN) of the amounts of deviation of the ideal angles IDA(AN) and the sum U_da(mc, AN) of the numbers of missing segments (their initial values: zero) (FIG. 11A/STEP616).

The axis number estimation unit 131 selects one YDIFF value Yd(mc, nc) (hereinafter, referred to as the current YDIFF value) from the set of the YDIFF values Yd(mc, n) (FIG. 11A/STEP618).

The axis number estimation unit 131 calculates the minimum value SL(mc, nc, AN) of the amount of deviation |Yd(mc, nc1)−IDA(AN)×U| (U is an integer satisfying 1≤U≤AU(AN)), which is the absolute value of a value obtained by subtracting a multiple of the ideal angle IDA (the multiple is in the range of 1 to a value corresponding to the permitted number of missing segments AU(AN)) from the current YDIFF value Yd(mc, nc), and a multiple U(mc, nc, AN) of the ideal angle having the minimum value SL(mc, nc, AN) (FIG. 11A/STEP620).

A value obtained by subtracting 1 from the multiple U(mc, nc, AN) of the ideal angle having the minimum value SL(mc, nc, AN) is added to the sum U_da(mc, AN) of the numbers of missing ideal angles IDA(AN) (FIG. 11A/STEP622).

The axis number estimation unit 131 adds the minimum value SL(mc, nc, AN) to the sum SL_da(mc, AN) of the amounts of deviation of the ideal angles IDA(AN) (FIG. 11A/STEP624).

Next, the meaning of the minimum value SL(mc, nc1, AN) and the value obtained by subtracting 1 from the multiple U(mc, nc1, AN) of the ideal angle IDA(AN) will be described with reference to FIGS. 21B to 21D.

As described above, the YDIFF value Yd(mc, nc1) is the difference between the minimum value Ymin(mc, nc1) of the Y-axis coordinate value of a segment SG(mc, nc1) and the minimum value Ymin(mc, nc2) of the Y-axis coordinate value of a segment SG(mc, nc2) (see FIG. 21A).

The amount of deviation |Yd(mc, nc1)−IDA(AN)×U| (U is an integer satisfying 1≤U≤AU(AN)) can be decomposed into |Ymin(mc, nc2)−(Ymin(mc, nc1)+IDA(AN)×U)|.

Figure 22:
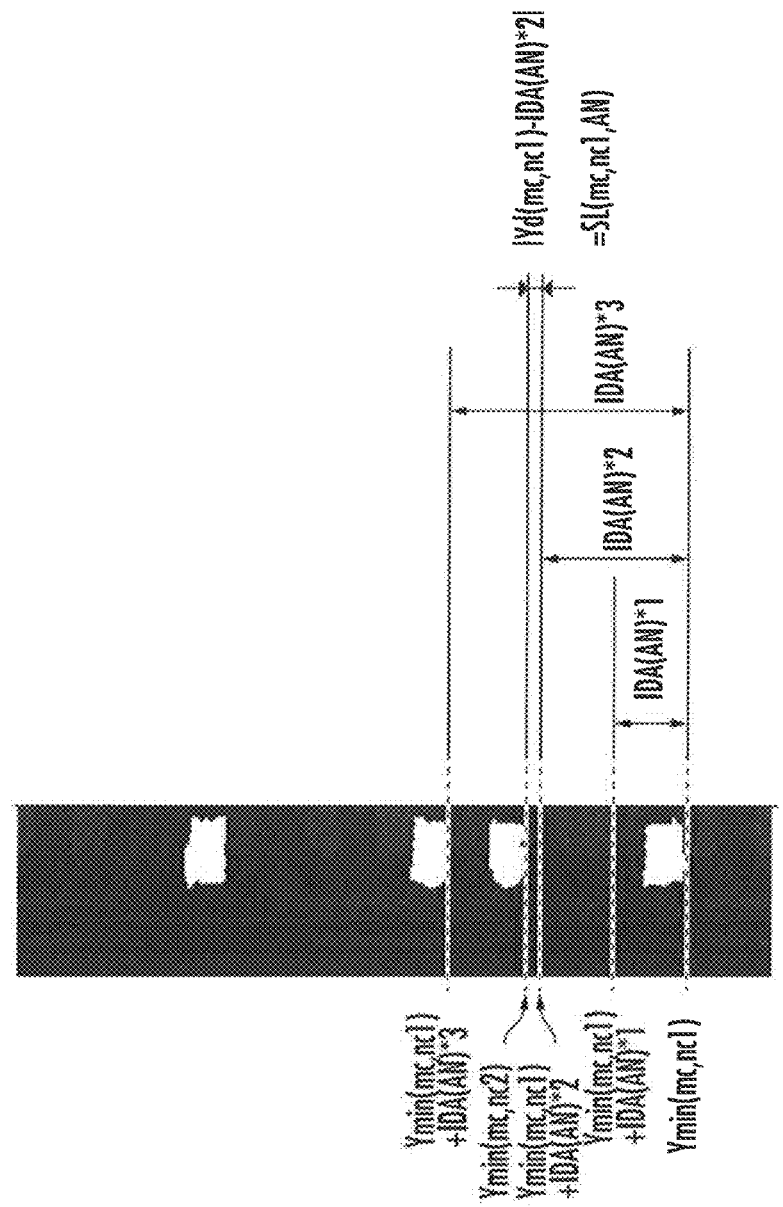
FIG. 22 is a diagram illustrating the meaning of the amount of deviation in the axis number estimation process.

(Yd(mc, nc1)+IDA(AN)×U) is the sum of Ymin(mc, nc1) and a multiple of IDA(AN) as in the case of U=1 to 3 in FIG. 22.

Therefore, the amount of deviation |Yd(mc, nc1)−IDA(AN)×U| means the difference between (Ymin(mc, nc1)+IDA(AN)×U) and Ymin(mc, nc2) as in the case of U=2 in FIG. 22.

The minimum value SL(mc, nc1, AN) of the amount of deviation |Yd(mc, nc1)−IDA(AN)×U| means the amount of deviation (difference) between the Y-axis position Ymin(mc, nc1)+IDA(AN)×U of an ideal segment which is determined from the ideal angle IDA(AN) and the Y-axis position Ymin(mc, nc2) of the actual segment.

The sum SL_da(mc, AN) of the amounts of deviation of the ideal angles IDA(AN) means the sum of the amounts of deviation of the ideal angles IDA(AN)×U for each of the segments SG(mc, n) belonging to the current cluster CL(mc).

The value obtained by subtracting 1 from the multiple U(mc, nc1, AN) means the number of missing segments between adjacent segments SG(mc, nc1, AN) and SG(mc, nc2, AN).

Therefore, the sum U_da(mc, AN) of the numbers of missing ideal angles IDA(AN) means the estimated number of missing segments in the entire current cluster CL(mc) (the difference between the number of segments which are actually present and the number of segments to be present in the current cluster) when the estimated number of axes in the current cluster CL(mc) is AN.

Then, the axis number estimation unit 131 determines whether the process from STEP618 to STEP624 has been performed for all of the YDIFF values Yd(mc, nc) (FIG. 11A/STEP626).

When the determination result is negative (FIG. 11A/STEP626: NO), the axis number estimation unit 131 performs the process after STEP618.

When the determination result is positive (FIG. 11A/STEP626: YES), the axis number estimation unit 131 determines whether the supposed number of axes AN is less than the maximum value (FIG. 11A/STEP628). The maximum value of the supposed number of axes is determined on the basis of the type of object (for example, a wheel).

When the determination result is negative (FIG. 11A/STEP628: NO), the axis number estimation unit 131 adds 1 to the supposed number of axes AN (FIG. 11A/STEP630) and performs the process after STEP612.

When the determination result is positive (FIG. 11A/STEP628: YES), the axis number estimation unit 131 determines whether the sum SL_da(mc, AN) of the amounts of deviation of the ideal angles is equal to or less than a predetermined deviation amount threshold value TL (FIG. 11B/STEP632).

When the determination result is positive (FIG. 11B/STEP632: YES), the axis number estimation unit 131 uses, the estimated number of axes EN(mc) in the current cluster CL(mc), the number of axes of IDA(AN) at which the sum U_da(mc, AN) of the numbers of missing ideal angles is the minimum, among the ideal angles IDA(AN) which has the sum SL_da(mc, AN) of the amounts of deviation equal to or less than the deviation amount threshold value TL (FIG. 11B/STEP634A).

When the determination result is negative (FIG. 11B/STEP632: NO), the axis number estimation unit 131 uses the number of axes AN of IDA(AN), at which the sum SL_da (mc, AN) of the amounts of deviation of the ideal angles, as the estimated number of axes EN(mc) in the current cluster CL(mc) (FIG. 11B/STEP634B).

That is, as in the case of AN=AN1 and AN2 in FIGS. 21B and 21C, it is appropriate that the sum U_Da(mc, AN) of the numbers of missing ideal angles is small when the sums SL_da(mc, AN1) and SL_da(mc, AN2) of the amounts of deviation of the ideal angles are less than the predetermined threshold value TL. As illustrated in FIG. 21D, it is appropriate that, when the sum SL_da(mc, AN3) of the amounts of deviation of the ideal angles is greater than the predetermined threshold value TL, the sum SL_da(mc, AN) of the amounts of deviation has priority over the sum of the numbers of missing segments.

Then, the axis number estimation unit 131 uses the sum SL_da(mc, EN(mc)) of the amounts of deviation of the ideal angles and the sum U_Da(mc, EN(mc)) of the numbers of missing ideal angles for the estimated number of axes EN(mc) as the amount of deviation SL_CL(mc) and the number of missing segments U_CL(mc) in the current cluster CL(mc) (FIG. 11B/STEP636).

Then, the axis number estimation unit 131 determines whether the process from STEP604 to STEP636 has been performed for all of the clusters CL(n) (FIG. 11B/STEP638).

When the determination result is negative (FIG. 11B/STEP638: NO), the axis number estimation unit 131 performs the process after STEP602.

When the determination result is positive (FIG. 11B/STEP638: YES), the axis number estimation unit 131 determines whether the amount of deviation SL_CL(m) of the cluster is equal to or less than a predetermined threshold value TL (FIG. 11B/STEP640).

When the determination result is positive (FIG. 11B/STEP640: YES), the axis number estimation unit 131 uses, as the estimated number of axes EN of the object, the estimated number of axes EN(m) in a cluster having the minimum number of missing segments U_CL(m) among the clusters CL(m) in which the amount of deviation SL_CL(m) is equal to or less than the deviation amount threshold value TL (FIG. 11B/STEP642A).

When the determination result is negative (FIG. 11B/STEP640: NO), the axis number estimation unit 131 uses, as the estimated number of axes EN of the object, the estimated number of axes EN(m) in the cluster CL(m) having the minimum amount of deviation SL_CL(m) (FIG. 11B/STEP642B).

The number of axes which are rotationally symmetric in the object is estimated by the axis number estimation process.

(Illumination Effect Cancellation process)

Next, the illumination effect cancellation process of the illumination effect cancellation unit 132 will be described with reference to FIG. 12.

Figure 12:
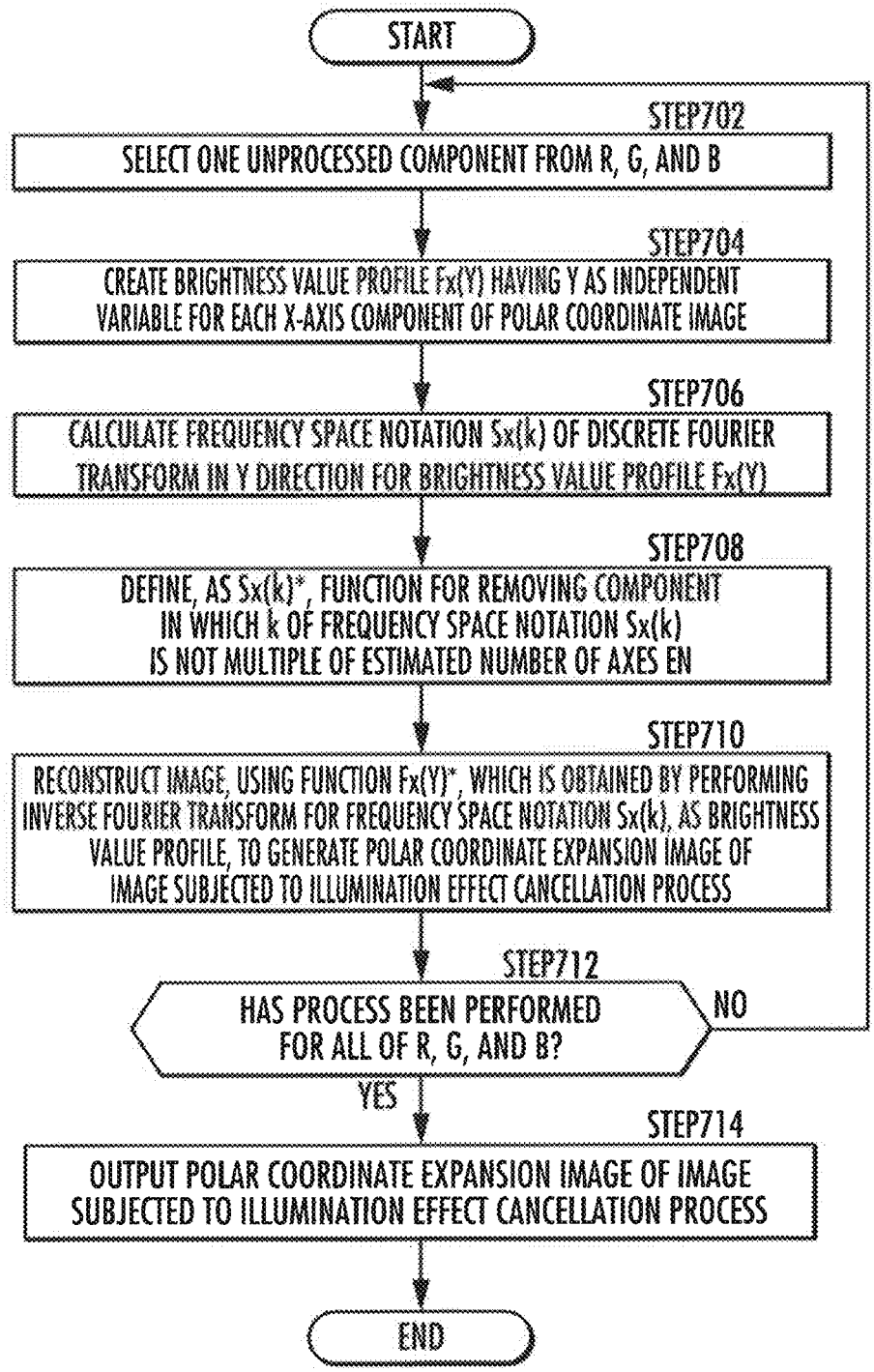
FIG. 12 is a flowchart illustrating an illumination effect cancellation process.

The illumination effect cancellation unit 132 selects one unprocessed component from R, G, and B components (FIG. 12/STEP702).

The illumination effect cancellation unit 132 creates a brightness value profile Fx(Y) having a circumferential direction (Y-axis direction) as an independent variable for each component of the polar coordinate expansion image PC1 of the original image Im1 in the radiation direction (X-axis direction) (FIG. 12/STEP704).

The illumination effect cancellation unit 132 calculates a frequency space notation Sx(k) of discrete Fourier transform in the Y direction for the brightness value profile Fx(Y) (FIG. 12/STEP706).

The illumination effect cancellation unit 132 defines, as Sx(k)*, a function obtained by performing frequency filtering for the frequency space notation Sx(k) (a process of removing a component in which k of the frequency space notation Sx(k) is not a multiple of the estimated number of axes EN) (FIG. 12/STEP708).

The illumination effect cancellation unit 132 performs inverse Fourier transform for a frequency space notation Sx(k)* to obtain a function Fx(Y)* and reconstructs an image, using the function Fx(Y)* as the brightness value profile, to create the polar coordinate expansion image CPC subjected to the illumination effect cancellation process (see FIGS. 23A to 23C) and the polar coordinate expansion image of the edge image subjected to the illumination effect cancellation process (FIG. 12/STEP710). Then, the illumination effect cancellation unit 132 uses the polar coordinate expansion image CPC subjected to the illumination effect cancellation process as the polar coordinate expansion image PC1 of the original image Im1 and uses the polar coordinate expansion image of the edge image subjected to the illumination effect cancellation process as the polar coordinate expansion image PC2 of the edge image Im2.

The illumination effect cancellation unit 132 determines whether the process from STEP704 to STEP710 has been performed for all of the R, G, and B components (FIG. 12/STEP712).

When the determination result is negative (FIG. 12/STEP712: NO), the illumination effect cancellation unit 132 performs the process after STEP702.

When the determination result is positive (FIG. 12/STEP712: YES), the illumination effect cancellation unit 132 outputs the polar coordinate expansion image CPC subjected to the illumination effect cancellation process (the polar coordinate expansion image in which frequency filtering in STEP708 has been performed for all of the R, G, and B components) to the vortex determination unit 133 (FIG. 12/STEP714).

Figure 23C:
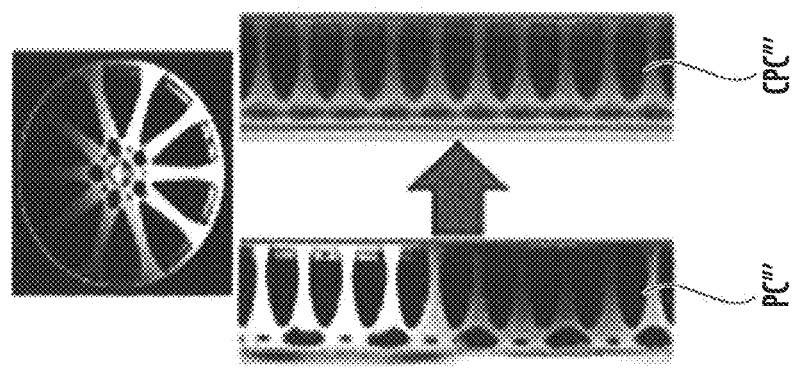
FIG. 23C is a diagram illustrating images before and after the illumination effect cancellation process when there is a shadow.
Figure 23B:
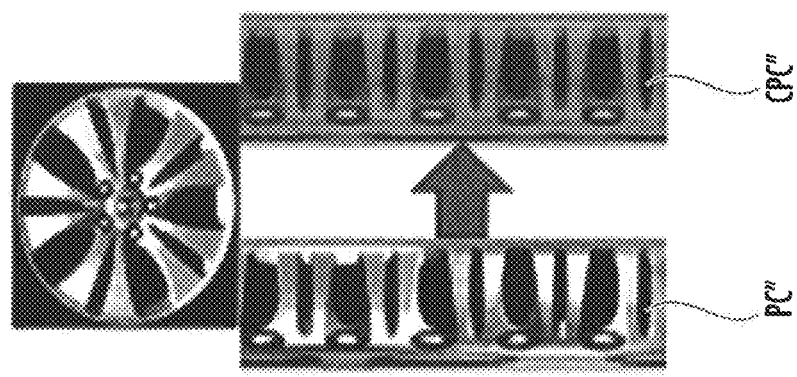
FIG. 23B is a diagram illustrating images before and after the illumination effect cancellation process when light from a predetermined direction is reflected.
Figure 23A:
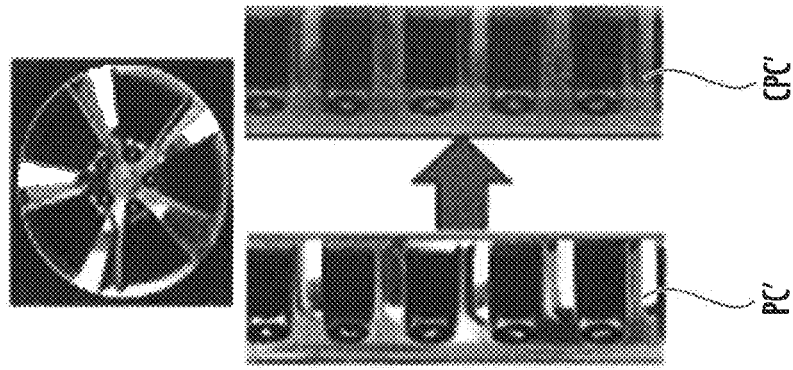
FIG. 23A is a diagram illustrating images before and after the illumination effect cancellation process when light from a predetermined direction is reflected.

As illustrated in FIGS. 23A to 23C, the brightness value of the pixel which is caused not by the shape or pattern of the object but by the influence of light or shadow is canceled by the illumination effect cancellation process.

(Vortex Determination Process)

Next, the vortex determination process of the vortex determination unit 133 will be described with reference to FIG. 13.

Figure 13:
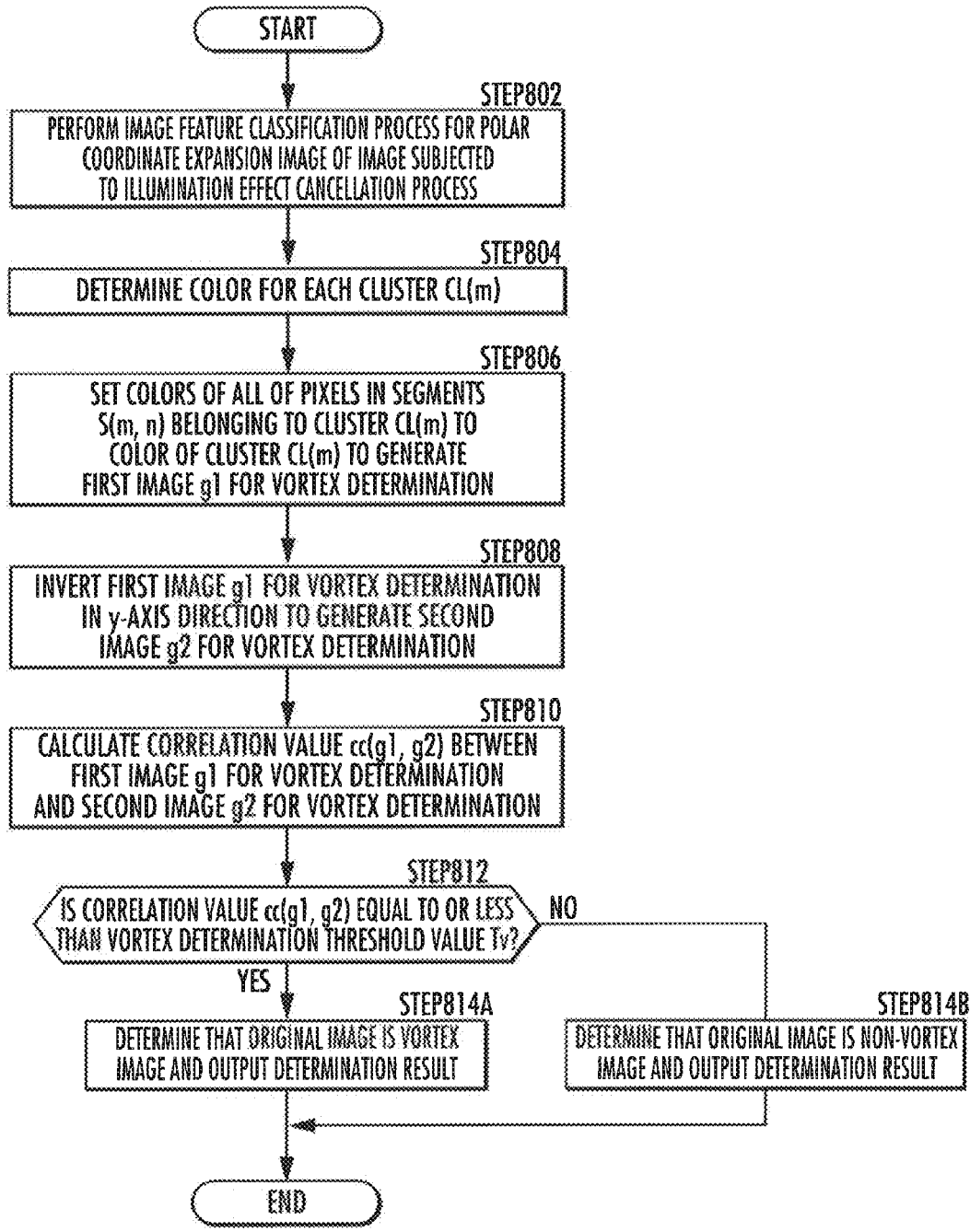
FIG. 13 is a flowchart illustrating a vortex determination process.

The vortex determination unit 133 directs the image feature classification unit 120 to perform the image feature classification process (FIG. 7) for the polar coordinate expansion image CPC subjected to the illumination effect cancellation process and acquires segment information and cluster information from the polar coordinate expansion image CPC subjected to the illumination effect cancellation process (FIG. 13/STEP802). Each cluster and each segment in the polar coordinate expansion image CPC subjected to the illumination effect cancellation process are represented by CL(m) and SG(m, n), respectively.

The vortex determination unit 133 determines the color of each cluster CL(m) in the polar coordinate expansion image CPC subjected to the illumination effect cancellation process such that a color space (an H component of HSV) is uniformly divided (FIG. 13/STEP804).

The vortex determination unit 133 sets the colors of all of the pixels in the segments SG(m, n) belonging to the cluster CL(m) to the color of the cluster CL(m) in the polar coordinate expansion image CPC subjected to the illumination effect cancellation process, thereby creating a first image g1 for vortex determination (FIG. 13/STEP806).

STEP804 and STEP806 in FIG. 13 may be omitted. When STEP804 and STEP806 in FIG. 13 are omitted, the polar coordinate expansion image CPC subjected to the illumination effect cancellation process becomes the first image g1 for vortex determination.

The vortex determination unit 133 inverts the first image g1 for vortex determination in the circumferential direction (Y-axis direction) to create a second image g2 for vortex determination (FIG. 13/STEP808).

Figure 24A:
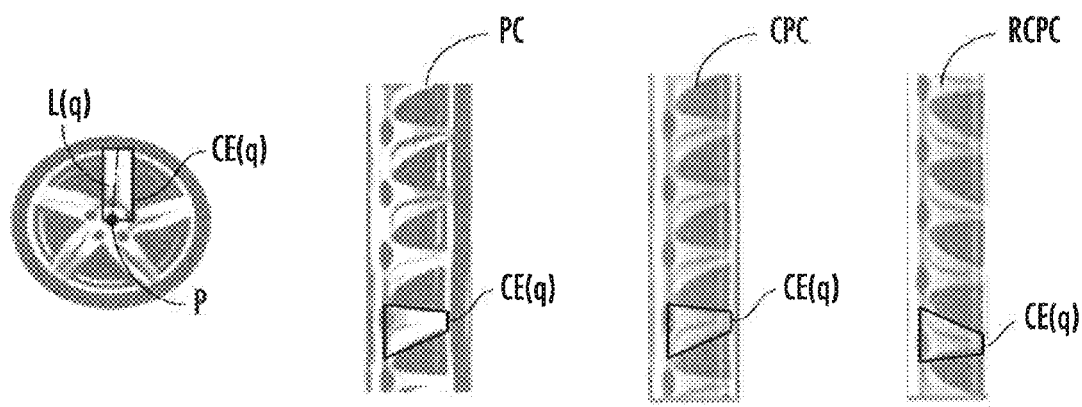
FIG. 24A is a diagram illustrating processing for a vortex image in the vortex determination process.
Figure 24B:
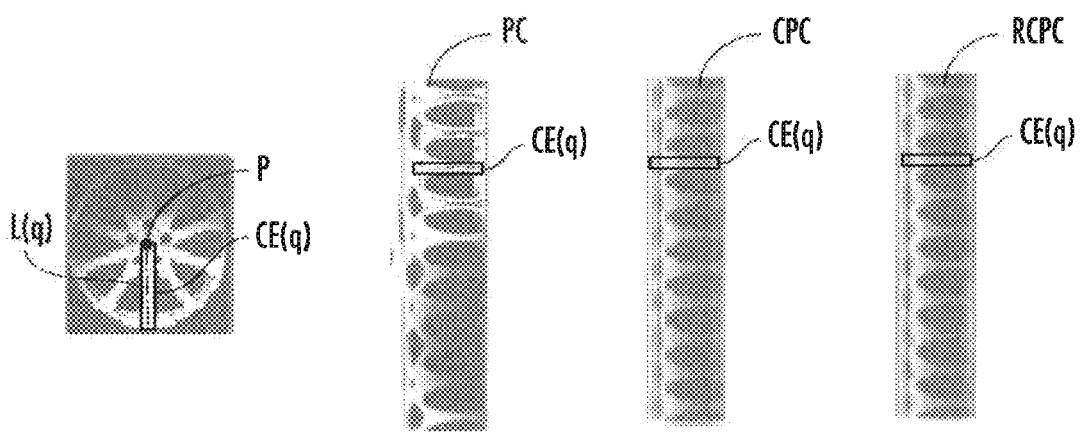
FIG. 24B is a diagram illustrating processing for a non-vortex image in the vortex determination process.

FIGS. 24A and 24B illustrate the first image g1 for vortex determination and the second image g2 for vortex determination when STEP804 and STEP806 in FIG. 13 are omitted.

The vortex determination unit 133 calculates a correlation value cc(g1, g2) between the first image g1 for vortex determination and the second image g2 for vortex determination using a matching process (FIG. 13/STEP810).

For example, when a component CE(q) which extends from the specific point P of the image region H of the object in the radiation direction (the X direction in the polar coordinate expansion image) is not symmetric with respect to a straight line L(q) which extends from the specific point P in the radiation direction as illustrated in FIG. 24A, a relatively small value is calculated as a correlation value cc(g1', g2') between a first image g1' for vortex determination and a second image g2' for vortex determination.

On the other hand, when the component CE(q) which extends from the specific point P of the image region H of the object in the radiation direction is symmetric with respect to the straight line L(q) which extends from the specific point P in the radiation direction as illustrated in FIG. 24B, a relatively large value is calculated as a correlation value cc(g1", g2") between a first image g1" for vortex determination and a second image g2" for vortex determination.

The vortex determination unit 133 determines whether the correlation value cc(g1, g2) is equal to or less than a vortex determination threshold value Tv (FIG. 13/STEP812). The vortex determination threshold value Tv is determined by machine learning for the known vortex image and the known non-vortex image.

When the determination result is positive (FIG. 13/STEP812: YES), the vortex determination unit 133 determines that the original image Im1 is a vortex image and stores the determination result in the storage unit 200 (FIG. 13/STEP814A).

When the determination result is negative (FIG. 13/STEP812: NO), the vortex determination unit 133 determines that the original image Im1 is a non-vortex image and stores the determination result in the storage unit 200 (FIG. 13/STEP814B).

(Scoring Process)

Next, the scoring process of the scoring unit 300 will be described with reference to FIG. 14.

Figure 14:
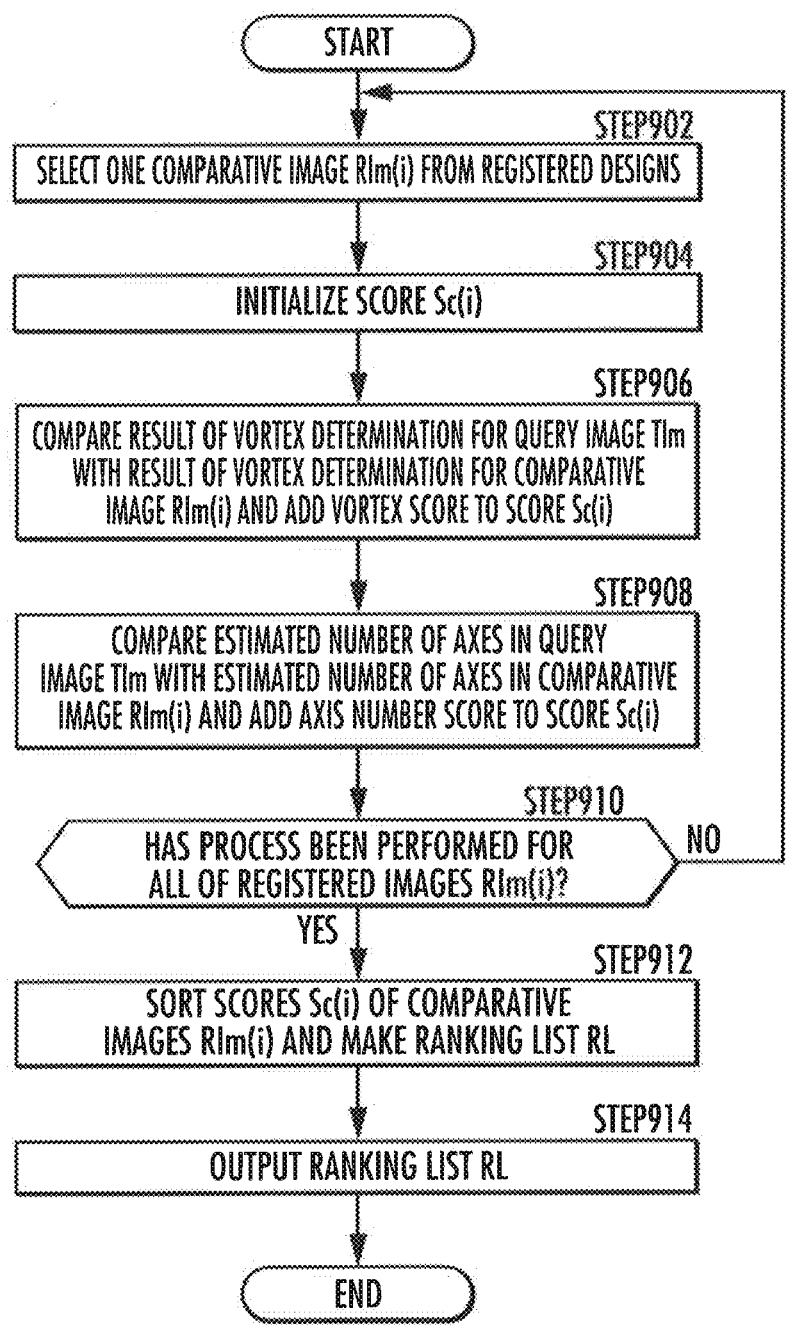
FIG. 14 is a flowchart illustrating a scoring process.

The scoring unit 300 selects an unprocessed image as a comparative registered image (hereinafter, referred to as a comparative image RIm(i)) from the registered images RIm(i) of all of the registered designs R(i) stored in the storage unit 200 (FIG. 14/STEP902).

The scoring unit 300 initializes the score SC(i) of the comparative image RIm(i) (initial value: 0) (FIG. 14/STEP904).

The scoring unit 300 compares the result of vortex determination for the query image TIm and the result of vortex determination for the comparative image RIm(i) to calculate a vortex score and adds the vortex score to the score Sc(i) (FIG. 14/STEP906). The vortex score may be a positive value or a negative value.

Specifically, the scoring unit 300 acquires the result of vortex determination for the query image TIm and the result of vortex determination for the comparative image RIm(i) with reference to the storage unit 200.

The scoring unit 300 adds a first predetermined vortex score to Sc(i) when the result of vortex determination for the query image TIm is consistent with the result of vortex determination for the comparative image RIm(i) (for example, when both the result of vortex determination for the query image TIm and the result of vortex determination for the comparative image RIm(i) indicate a vortex image or when both the result of vortex determination for the query image TIm and the result of vortex determination for the comparative image RIm(i) indicate a non-vortex image).

On the other hand, the scoring unit 300 a second predetermined vortex score less than the first vortex score to Sc(i) when the result of vortex determination for the query image TIm is not consistent with the result of vortex determination for the comparative image RIm(i) (for example, when the result of vortex determination for the query image TIm indicates a vortex image and the result of vortex determination for the comparative image RIm(i) indicate a non-vortex image, or when the result of vortex determination for the query image TIm indicates a non-vortex image and the result of vortex determination for the comparative image RIm(i) indicate a vortex image).

When the result of vortex determination for the query image TIm indicates a non-vortex image, the scoring unit 300 may acquire the ranges of the X-coordinate values (the coordinate value in the radiation direction) of the segments in the query image TIm and the comparative image RIm(i) from the storage unit 200, calculate the widths of the ranges, and subtract a third vortex score corresponding to the difference between the widths from the score Sc(i). This is because the difference between the ranges of the X-coordinate values generally affects similarity determination in the case of a non-vortex image.

The scoring unit 300 compares the estimated number of axes in the query image TIm with the estimated number of axes in the comparative image RIm(i) to calculate an axis number score and adds the axis number score to the score Sc(i) (FIG. 14/STEP908). The axis number score may be a positive value or a negative value.

Specifically, the scoring unit 300 adds the highest score as the axis number score to the score Sc(i) when the estimated number of axes in the query image TIm is equal to the estimated number of axes in the comparative image RIm(i).

On the other hand, when the estimated number of axes in the query image TIm is not equal to the estimated number of axes in the comparative image RIm(i), the scoring unit 300 adds the higher score as the axis number score to the score Sc(i) as the difference between the estimated number of axes in the query image TIm and the estimated number of axes in the comparative image RIm(i) becomes smaller.

When the estimated number of axes in the comparative image RIm(i) is a multiple of the estimated number of axes in the query image TIm or when the estimated number of axes in the query image TIm is a multiple of the estimated number of axes in the comparative image RIm(i), the scoring unit 300 adds a positive score as the axis number score to the score Sc(i).

Then, the scoring unit 300 determines whether the process from STEP904 to STEP908 has been performed for all of the registered images RIm(i) (FIG. 14/STEP910).

When the determination result is negative (FIG. 14/STEP910: NO), the scoring unit 300 performs the process after STEP902.

When the determination result is positive (FIG. 14/STEP910: YES), the scoring unit 300 sorts the scores Sc(i) of all of the comparative images RIm(i) to make a ranking list RL (FIG. 14/STEP912).

The scoring unit 300 does not need to put all information into the ranking list RL and may make the ranking list RL using information about only a predetermined number (for example, top twenty scores Sc(i)) of top registered designs R(i) or may make the ranking list RL using information about the registered designs R(i) with scores equal to or greater than a predetermined score.

The scoring unit 300 transmits the ranking list RL to the user terminal 2 (FIG. 14/STEP914).

The scoring unit 300 performs scoring on the basis of the similarity and difference between a feature portion of the image region of the object, and the query image TIm and each comparative image RIm(i), such as the estimated number of axes and the result of vortex determination. As a result, the similarity and difference between the feature portion of the image region of the object, and the query image TIm and each comparative image RIm(i) are reflected in the score.

In addition to the above-mentioned process, scoring may be performed on the basis of central coordinate information and information, such as the YDIFF value. In particular, it is preferable to perform scoring using at least one of region information (effective radius), a cluster size, and the average value of the areas of the segments. In particular, a cluster in which the average value of the areas of the segments is the maximum among the clusters included in the query image TIm is matched with a cluster in which the average value of the areas of the segments is the maximum among the clusters included in the comparative image RIm(i). Therefore, information (information about, particularly, a portion which accounts for a large area among visible portions) which contributes to determining the similarity between the designs is appropriately considered. As a result, the accuracy of determining the similarity between the designs is improved.

(Other Embodiments)

The object region determination unit 113 may use, as the radius of the image region of the object, the maximum distance among the distances from the specific point P at which the specific point P of the brightness value of each pixel is equal to or greater than a predetermined value.

In this embodiment, the object image region extraction unit 110 of the similar design search server 1 generates the polar coordinate expansion image as the image of the object. However, the object image region extraction unit 110 may extract the image region of the object from the original image and use the extracted image as the image of the object, instead of or in addition to the above-mentioned structure.

In this case, the design feature information acquisition unit 130 may perform the matching between the image and a predetermined template image to calculate design features, such as the estimated number of axes and the result of vortex determination.

The first vortex score, the second vortex score, the third vortex score, and the axis number score may be set to predetermined values by the user and the similarity information may be calculated by machine learning based on a plurality of known images.

The invention claimed is:

1. An image analysis device, comprising:
at least one processor; and
at least one memory including computer program code,
wherein the at least one memory and the computer program code are configured to, with the at least one processor, cause the image analysis device to:
acquire an original image including a designated image region which is rotationally symmetric with respect to a first point;
generate a reference image by rotating the original image about a second point on the original image;
calculate a correlation value between the original image and the reference image at each relative position by virtually and relatively moving the original image with respect to the reference image;
detect the position of the first point in the original image, according to a geometric model indicating a relative positional relationship between the first point and the second point in the original image, on the basis of the amount of rotation of the reference image about the second point at a relative position between the original image and the reference image where the correlation value is the maximum and a vector indicating a deviation between the second point of the original image and the second point of the reference image; and
specify a range of the designated image region in the original image, based on the detected position of the first point and a distribution of brightness values of pixels in the original image.

2. The image analysis device according to claim 1,
wherein the at least one memory and the computer program code are further configured to, with the at least one processor, cause the image analysis device to:
generate a polar coordinate expansion image of the designated image region, which has the position of the first point as the origin, has an axis corresponding to a radius direction of the designated image region as a first axis, and has, as a second axis, an axis that corresponds to a circumferential direction of the designated image region and is perpendicular to the first axis, based on the first point and the range of the designated image region; and
analyze the polar coordinate expansion image and acquires feature information included in the polar coordinate expansion image.

3. The image analysis device according to claim 2,
wherein the at least one memory and the computer program code are further configured to, with the at least one processor, cause the image analysis device to:
generate an edge image of the original image and generate a polar coordinate expansion image of the edge image, which has a first point of the edge image as the origin, to generate the polar coordinate expansion image of the designated image region;
separate the polar coordinate expansion images into a plurality of segments which are partitioned by an edge line; and
compare the shape of each segment included in the polar coordinate expansion image with the shape of each segment included in an image obtained by inverting the polar coordinate expansion image in the direction of the second axis and determines whether each segment is symmetric with respect to a straight line parallel to the first axis.

4. The image analysis device according to claim 2,
wherein the at least one memory and the computer program code are further configured to, with the at least one processor, cause the image analysis device to:
generate an edge image of the original image and generate a polar coordinate expansion image of the edge image, which has a first point of the edge image as the origin, to generate the polar coordinate expansion image of the designated image region;
separate the polar coordinate expansion images into a plurality of segments which are partitioned by an edge line;
group a plurality of segments having a similar shape into one cluster; and
acquire a distance between the segments, which belong to each cluster and are adjacent to each other in the direction of the second axis, in the polar coordinate expansion image in the direction of the second axis.

5. The image analysis device according to claim 4,
wherein
on condition that the designated image region has a predetermined number of rotational symmetries which is equal to or greater than 2, the at least one memory and the computer program code are further configured to, with the at least one processor, cause the image analysis device to calculate an amount of deviation which is a difference between a theoretical distance between segments that are adjacent to each other in the direction of the second axis in each cluster in the second axis direction, and the actual distance between the adjacent segments in the second axis direction, which is acquired by the image analysis device, and
when the sum of the amounts of deviation in the one cluster is equal to or less than a predetermined threshold value, the at least one memory and the computer program code are further configured to, with the at least one processor, cause the image analysis device to estimate that the designated image region has the predetermined number of rotational symmetries.

6. The image analysis device according to claim 5,
wherein the at least one memory and the computer program code are further configured to, with the at least one processor, cause the image analysis device to:

calculate the amount of deviation between the adjacent segments belonging to each cluster for the predetermined number of rotational symmetries at each test distance obtained by multiplying a unit distance which is determined from the predetermined number of rotational symmetries by an integer equal to or greater than 1;

calculate, as the number of missing segments, a value obtained by subtracting 1 from the multiplied integer for the test distance having the minimum amount of deviation among the amounts of deviation; and when the sum of the minimum amounts of deviation in one cluster is equal to or less than the threshold value and the sum of the numbers of missing segments in one cluster is the minimum, estimate that the designated image region has the predetermined number of rotational symmetries.

7. An apparatus that scores a similarity between a first designated image region included in a first image and a second designated image region included in a second image, and determines a similarity between designs included in the two images, comprising:

at least one processor; and
at least one memory including computer program code, wherein the at least one memory and the computer program code are configured to, with the at least one processor, cause the image analysis device to
acquire an original image including a designated image region which is rotationally symmetric with respect to a first point,
generate a reference image by rotating the original image about a second point on the original image,
calculate a correlation value between the original image and the reference image at each relative position by virtually and relatively moving the original image with respect to the reference image,
detect the position of the first point in the original image, according to a geometric model indicating a relative positional relationship between the first point and the second point in the original image, on the basis of the amount of rotation of the reference image about the second point at a relative position between the original image and the reference image where the correlation value is the maximum and a vector indicating a deviation between the second point of the original image and the second point of the reference image,
specify a range of the designated image region in the original image, based on the detected position of the first point and a distribution of brightness values of pixels in the original image, and
perform scoring based on feature information of the first designated image region included in the first image, which is acquired by the analysis of the first image by the image analysis device, and feature information of the second designated image region included in the second image, which is acquired by the analysis of the second image by the apparatus.

8. The design similarity determination apparatus according to claim 7, wherein the at least one memory and the computer program code are further configured to, with the at least one processor, cause the apparatus device to:

receive a designated query image;
store feature information of a plurality of comparative images; and perform the scoring, using the designated query image as the first image and each of the plurality of comparative images as the second image, to calculate the score of each of the comparative images and sorts the scores of the comparative images to make a ranking list of images including a design similar to the query image.

9. A method for creating an image feature information database that is performed by a computer including a storage unit for storing information, the method comprising:

a correlation value calculation step of moving an original image including a designated image region which is rotationally symmetric with respect to a first point relative to a reference image which is obtained by rotating the original image about a second point on the original image and calculating a correlation value between the original image and the reference image at each relative position;

a first point detection step of detecting the position of the first point in the original image, according to a geometric model indicating a relative positional relationship between the first point and the second point in the original image, based on the amount of rotation of the reference image about the second point at a relative position between the original image and the reference image where the correlation value is the maximum and a vector indicating a deviation between the second point of the original image and the second point of the reference image;

a region specifying step of specifying a range of the designated image region in the original image, based on the detected position of the first point and a distribution of brightness values of pixels in the original image;

an image generation step of generating a polar coordinate expansion image of the designated image region, which has the position of the first point as the origin, based on the first point and the range of the designated image region;

a feature information acquisition step of analyzing the polar coordinate expansion image and acquiring feature information included in the polar coordinate expansion image; and a step of storing the feature information obtained in the feature information acquisition step in the storage unit so as to be associated with the original image and creating an image feature information database.

10. A design similarity determination method that is performed by a computer, scores a similarity between a first designated image region included in a first image and a second designated image region included in a second image, and determines a similarity between designs included in the two images, comprising:

a correlation value calculation step of moving an original image including a designated image region which is rotationally symmetric with respect to a first point relative to a reference image which is obtained by rotating the original image about a second point on the original image and calculating a correlation value between the original image and the reference image at each relative position;

a first point detection step of detecting the position of the first point in the original image, according to a geometric model indicating a relative positional relationship between the first point and the second point in the original image, based on the amount of rotation of the reference image about the second point at a relative position between the original image and the reference image where the correlation value is the maximum and a vector indicating a deviation between the second point of the original image and the second point of the reference image;

a region specifying step of specifying a range of the designated image region in the original image, based on the detected position of the first point and a distribution of brightness values of pixels in the original image;

a polar coordinate expansion image generation step of generating a polar coordinate expansion image of the designated image region, which has the position of the first point as the origin, based on the first point and the range of the designated image region;

a feature information acquisition step of analyzing the polar coordinate expansion image and acquiring feature information included in the polar coordinate expansion image; and a scoring step of performing storing based on feature information of the first designated image region included in the first image and feature information of the second designated image region included in the second image which are acquired in the feature information acquisition step, wherein the scoring step is performed after the correlation value calculation step, the first point detection step, the region specifying step, the polar coordinate expansion image generation step, and the feature information acquisition step are performed for the first image and the second image.

11. The design similarity determination method according to claim 10, wherein the computer includes a query image designation unit that receives a designated query image and a storage unit that stores feature information of a plurality of comparative images, and the method further includes:

a comparative image scoring step of performing the scoring in the scoring step, using the query image as the first image and each of the plurality of comparative images as the second image, to calculate the score of each of the comparative images; and a ranking list making step of sorting the scores of the comparative images to make a ranking list of images including a design similar to the query image.

* * * * *